US012664128B2

(12) United States Patent
Qiu et al.

(10) Patent No.: US 12,664,128 B2
(45) Date of Patent: Jun. 23, 2026

(54) DATA PROCESSING METHOD AND ELECTRONIC DEVICE

(71) Applicant: HUAWEI TECHNOLOGIES CO., LTD., Shenzhen (CN)

(72) Inventors: Jie Qiu, Hangzhou (CN); Wei Fang, Hangzhou (CN); Xie Miao, Hangzhou (CN); Jing Qian, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/973,073

(22) Filed: Dec. 8, 2024

(65) Prior Publication Data

US 2025/0103557 A1 Mar. 27, 2025

Related U.S. Application Data

(63) Continuation of application No. PCT/CN2023/099123, filed on Jun. 8, 2023.

(30) Foreign Application Priority Data

Jun. 10, 2022 (CN) .......................... 202210654818.X

(51) Int. Cl.
G06F 16/17 (2019.01)
G06F 16/174 (2019.01)

(52) U.S. Cl.
CPC ................................. *G06F 16/1748* (2019.01)

(58) Field of Classification Search
CPC ......... G06F 16/1748; G06F 2221/2107; G06F 21/602; G06F 16/13; G06F 21/60; G06F 21/62; G06F 21/6218; G06F 16/162; G06F 16/168; G06F 16/1844
See application file for complete search history.

(56) References Cited

U.S. PATENT DOCUMENTS

| | | | |
|---|---|---|---|
| 8,706,703 B2 | 4/2014 | Factor et al. | |
| 9,081,771 B1* | 7/2015 | Faibish | G06F 21/6218 |
| 2012/0330904 A1* | 12/2012 | Factor | G06F 16/1748 |
| | | | 707/E17.002 |
| 2017/0177899 A1 | 6/2017 | Ng et al. | |
| 2022/0244869 A1* | 8/2022 | Kanteti | G06F 3/0605 |
| 2022/0350702 A1* | 11/2022 | Bono | G06F 3/0641 |

* cited by examiner

*Primary Examiner* — Ajay M Bhatia
*Assistant Examiner* — Cindy Nguyen

(57) ABSTRACT

In a data processing method, an electronic device detects that a first file and a second file are duplicate files, with a first index node of the first file pointing to file data of the first file, and a second index node of the second file pointing to file data of the second file. The electronic device generates a target index node and configures the target index node to point to the file data of the first file. The electronic device associates the first index node with the target index node, and separately associates the second index node with the target index node. The electronic device then deletes the file data of the second file.

18 Claims, 29 Drawing Sheets

Electronic device 100

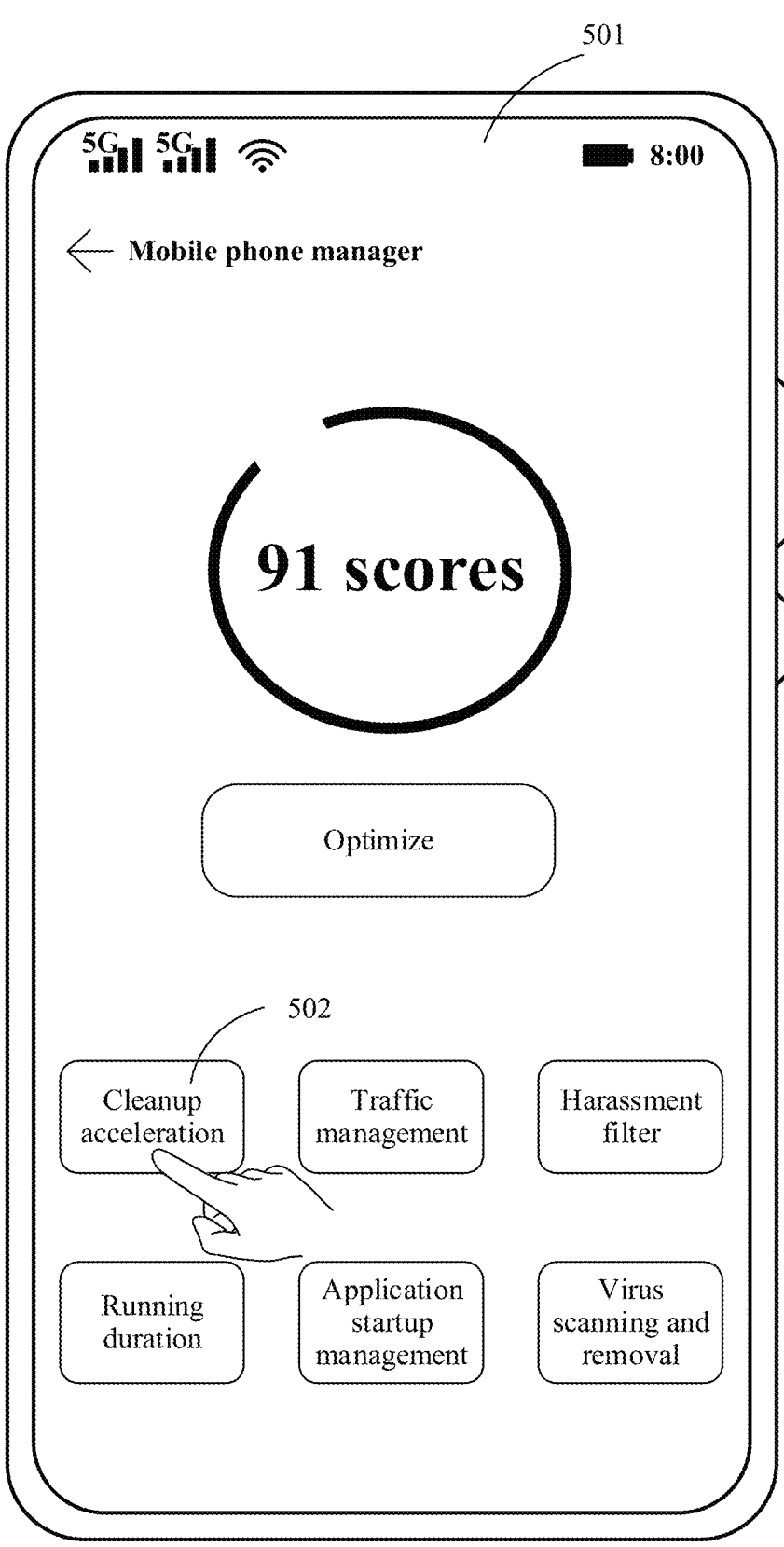
FIG. 5a(1)

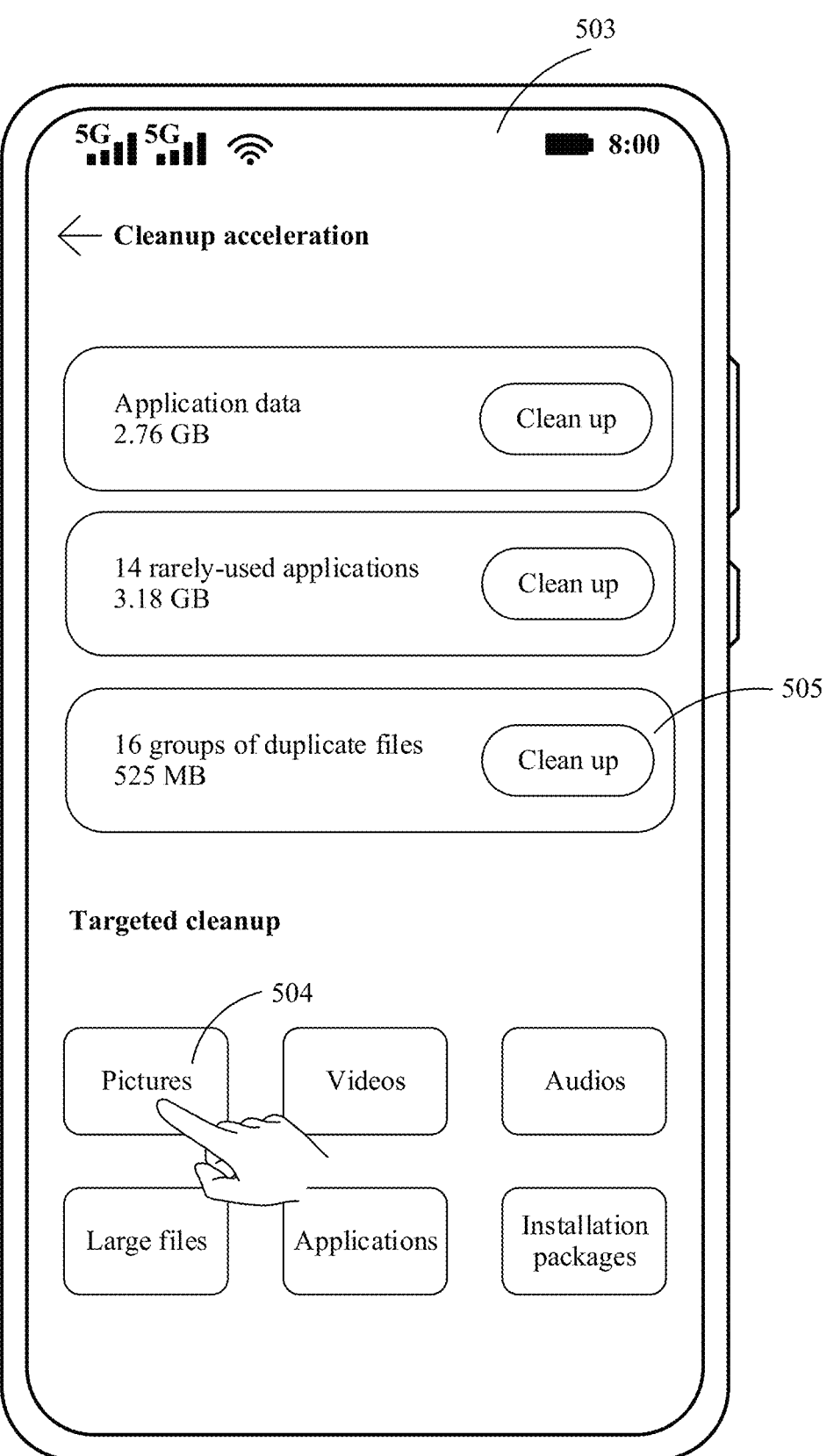
FIG. 5a(2)

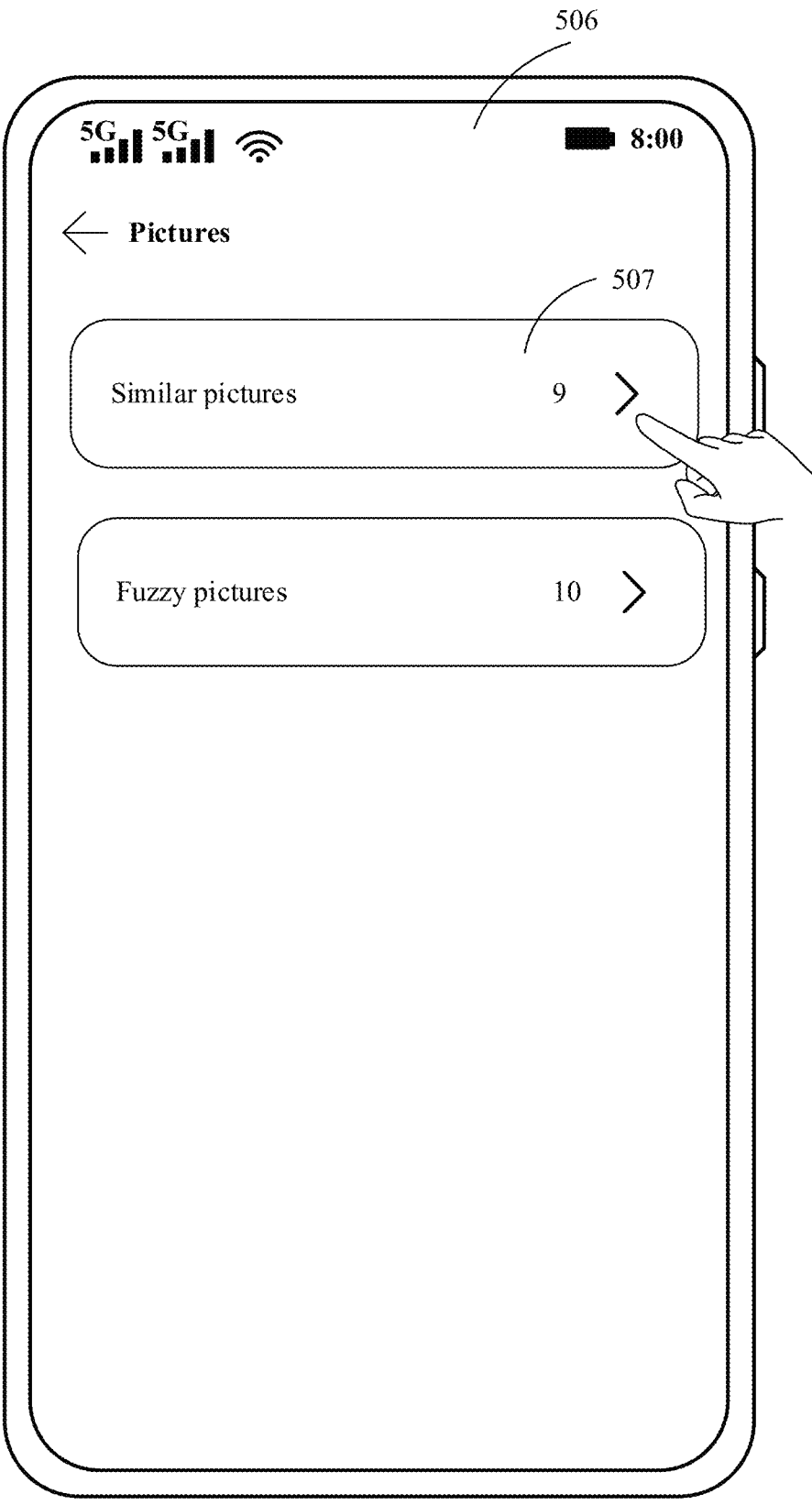
FIG. 5a(3)

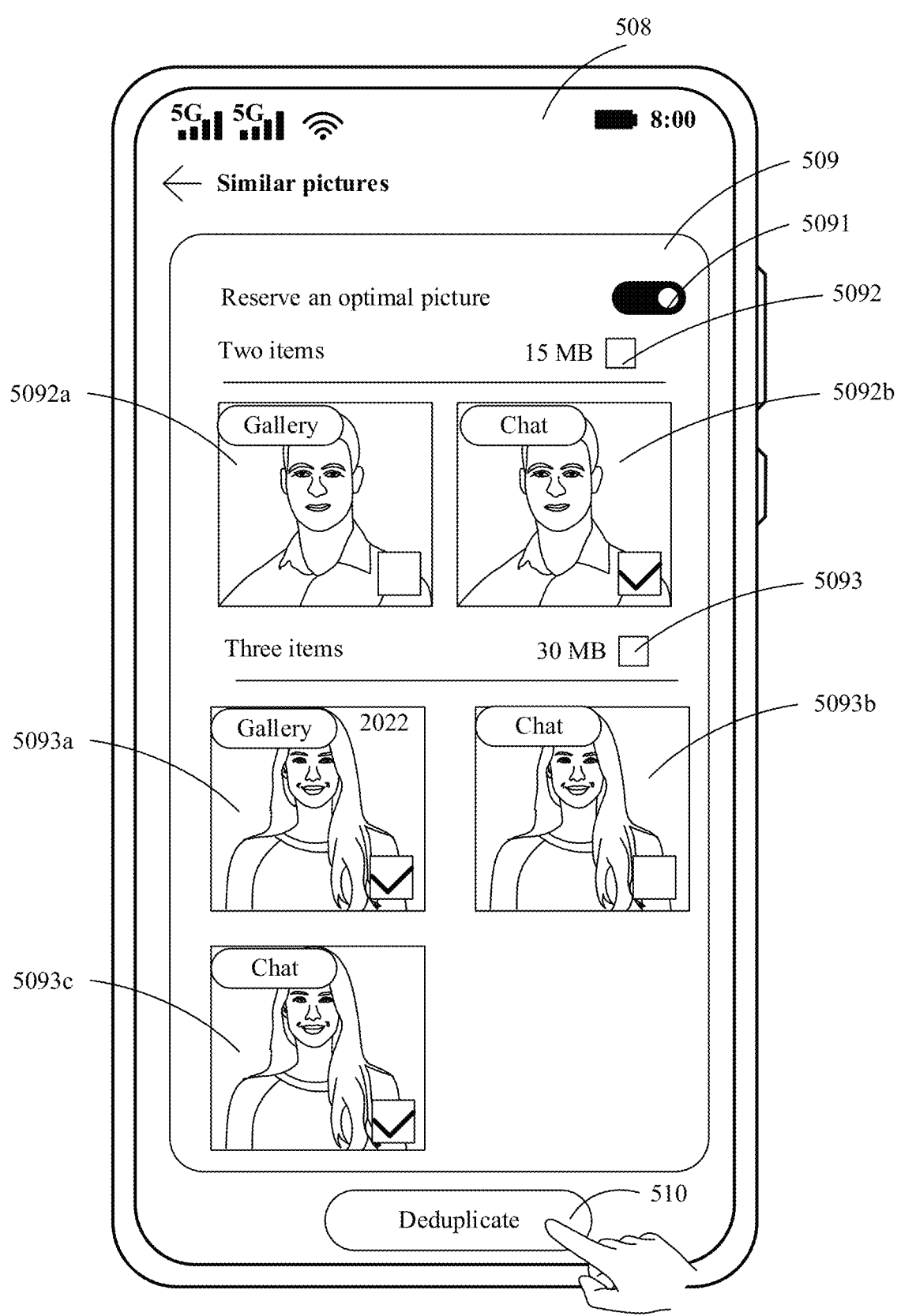
FIG. 5a(4)

1

DATA PROCESSING METHOD AND ELECTRONIC DEVICE

CROSS-REFERENCE TO RELATED APPLICATIONS

This application is a continuation of International Application PCT/CN2023/099123, filed on Jun. 8, 2023, which claims priority to Chinese Patent Application 202210654818.X, filed on Jun. 10, 2022. The disclosures of the aforementioned applications are hereby incorporated by reference in their entirety.

TECHNICAL FIELD

Embodiments of this application relate to the field of data processing, and in particular, to a data processing method and an electronic device.

BACKGROUND

With development of the field of terminal devices, functions of a mobile phone are increasingly powerful, and more data is generated accordingly. A user may periodically clean up the data in the mobile phone to improve storage space utilization of the mobile phone. However, in a manner of cleaning up redundant data in a conventional technology, at least one piece of data in a plurality of pieces of similar data is deleted. When the user wants to access the deleted data, this manner may cause a failure to find the data. This affects user experience.

SUMMARY

To resolve the foregoing technical problem, this application provides a data processing method and an electronic device. In the method, the electronic device may associate index nodes of duplicate files with a target index node, and delete file data of a duplicate file, to reduce occupied storage space when data security is ensured.

According to a first aspect, an embodiment of this application provides a data processing method. The method includes: An electronic device detects that a first file and a second file are duplicate files, and generates a target index node, where a first index node of the first file points to file data of the first file, and a second index node of the second file points to file data of the second file; the electronic device configures the target index node to point to the file data of the first file; the electronic device associates the first index node with the target index node and associates the second index node with the target index node; and the electronic device deletes the file data of the second file.

In this way, when processing the duplicate files, the electronic device associates the index nodes of the duplicate files with the newly generated target index node, and deletes file data of a duplicate file, to reduce storage space occupied by redundant data, thereby improving storage space utilization. In addition, in a manner of associating the index nodes of the files with the target index node, imperception for an upper-layer application can be implemented. In other words, for the upper-layer application, during reading or writing, the upper-layer application may still indicate a file system to find data based on the index nodes of the files, and the electronic device may perform conversion between the index nodes based on association relationships between the index nodes and the target index node, to find corresponding data based on the target index node. In other words, for the upper-layer application, the second file still exists, and therefore data reading or writing of the second file by the application is not affected. In addition, in an embodiment of this application, because the index nodes are associated with the target index node, if the upper-layer application queries content in an index node, information such as a type of recorded data in the content in the index node remains unchanged. Therefore, for the upper-layer application, the index node remains unchanged. Further, the information such as the type in the index node remains unchanged, and correspondingly, when the upper-layer application reads or writes data, a data type presented by the index node is still the same as that before and remains unchanged. This avoids a problem of a data reading or writing failure caused by a modification of data in the index node.

In an embodiment of this application, the electronic device deletes file data of a duplicate file, for example, the second file. Because the second index node is associated with the target index node, the electronic device can still find the file data via an association relationship between the index node and the target index node. For example, file data of a first picture in a gallery application is the same as that of a second picture in a chat application. In an embodiment of this application, an index node of the first picture and an index node of the second picture are both associated with a target index node. The target index node points to the file data of the first picture, and the file data of the second picture is deleted. In this way, storage space occupied by same data in the second picture as that in the first picture is reduced. In addition, when the chat application needs to query the second picture or the gallery application needs to query the first picture, corresponding file data may be found via the target index node. In other words, although second file data of the second picture is deleted, for the chat application, the second file still exists, and reading or writing of the data of the second file by the chat application is not affected.

In an embodiment of this application, the association relationship between the index node of the file and the target index node may also be understood as a correspondence.

In an embodiment of this application, a pointing relationship may be understood as that the index node includes index information, and the index information indicates a storage address of data.

For example, the first file may be a picture 1 in an embodiment of this application, and the second file may be a picture 2 in an embodiment of this application. The first index node may be an index node 11, and the second index node may be an index node 12. The target index node may be an index node 21.

According to the first aspect, associating the first index node with the target index node and associating the second index node with the target index node include: associating identification information of the first index node with identification information of the target index node; and associating identification information of the second index node with the identification information of the target index node. In this way, in an embodiment of this application, the identification information of the two index nodes is associated with the identification information of the target index node, and the information such as the type of the data stored in the index node does not need to be changed. Therefore, for the upper-layer application, the information (such as the type of the data) stored in the index node is unchanged. This implements imperception for the upper-layer application. For example, when the upper-layer application needs to query a data type of data to which the index node points, the data type of the data is still consistent with that before.

According to any one of the first aspect and the foregoing implementations of the first aspect, identification information is identity ID information or address information of an index node. For example, the address information is a storage location of the index node in a memory. For example, the ID information may be allocated to the index node when the index node is generated. For example, address information and ID information of each index node are unique. For example, the address information of the index node may be changed. If the address information of the index node is changed, the address information recorded in the association relationship between the index node and the target index node is changed accordingly. For example, the ID information of the index node is unchanged. For example, after the storage location of the index node is changed, the ID information of the index node remains unchanged.

According to any one of the first aspect and the foregoing implementations of the first aspect, the file data of the first file is completely the same as the file data of the second file. In an embodiment of this application, duplicate files are optionally two or more files whose data is completely the same, or two or more files whose data is similar. The similar data optionally means that 80% (which may be set based on an actual requirement) or more of data in two files is the same.

According to any one of the first aspect and the foregoing implementations of the first aspect, if the file data of the first file is partially the same as the file data of the second file, after the second index node is associated with the target index node, the second index node further points to data that is in the file data of the second file and that is different from that in the file data of the first file. In this way, in an embodiment of this application, for similar files, data that is in the first file and that is the same as that in the second file may be found via the association relationship between the index node and the target index node, or data that is different from that in the first file may be found based on the second index node. This is also imperceptible for the upper-layer application. The electronic device may perform conversion between the index nodes based on an indication from the upper-layer application, to determine whether an index that needs to be read is associated with the target index node or directly points to data.

According to any one of the first aspect and the foregoing implementations of the first aspect, deleting the file data of the second file includes: The electronic device deletes data that is in the file data of the second file and that is the same as that in the file data of the first file. In this way, in an embodiment of this application, the same data is deleted to reduce storage space occupied by the data of the second file. In addition, different data is reserved to avoid affecting reading or writing of the second file. In other words, in an embodiment of this application, the index nodes are associated with the target index node, and pointing relationships for pointing to different data is retained, to implement deduplication of the similar files.

According to any one of the first aspect and the foregoing implementations of the first aspect, the first index node includes a first key. The target index node includes the first key. The second index node includes a second key. The file data of the first file is generated through encryption based on the first key, and the file data of the second file is generated based on the second key. In this way, in an embodiment of this application, the target index node is introduced, so that a file data can have a corresponding key. This ensures security of file data. In a process in which the application reads or writes data, the electronic device may encrypt or decrypt the file data of the first file based on the key of the target index node.

For example, data to which the second index node points and that is different from the data of the first file may be encrypted or decrypted based on the key of the second index node. In this way, each piece of data corresponds to a key. This improves data security.

According to any one of the first aspect and the foregoing implementations of the first aspect, the method further includes: In response to first indication information from a target application, the electronic device determines to read the second file; and the electronic device detects that the second index node is associated with the target index node, and reads the file data of the first file based on the target index node. In this way, in a data reading process, the electronic device may implement, based on an indication from the application, conversion between the index nodes, to read corresponding data via the target index node. The upper-layer application still considers that the second file is read. This implements imperception for the upper-layer application.

According to any one of the first aspect and the foregoing implementations of the first aspect, the method further includes: In response to second indication information from a target application, the electronic device writes new data into the file data of the second file, where the new data is different from the file data of the first file; and the electronic device configures the second index node to point to the new data, where the second index node is still associated with the target index node. In this way, in a data writing process, the upper-layer application still considers that the data is written into the second file. This implements imperception for the upper-layer application, and avoids mutual interference in writing processes.

For example, the first file is a file of a gallery application, and the second file is a file of a chat application. When the chat application needs to modify the second file, a writing instruction may be delivered to the electronic device. For the chat application, the instruction delivered by the chat application is for the second file. This implements imperception for the upper-layer application. The memory may write data into the memory based on the indication from the chat application. One of indexes in the second index node is configured to point to new data when another index is still associated with the target index node. In other words, if the chat application needs to query (for example, reads) the second file, the electronic device may read, based on an association relationship and a pointing relationship of the index node, the data that is in the first file and that is the same as that in the second file via the target index node, or directly read the data of the second file via the index in the second index node. This avoids mutual interference between reading and writing of the duplicate files.

According to any one of the first aspect and the foregoing implementations of the first aspect, before the target index node is configured to point to the file data of the first file, the first index node includes first index information, the first index information indicates a storage location of the file data of the first file, the second index node includes second index information, and the second index information indicates a storage location of the file data of the second file.

According to any one of the first aspect and the foregoing implementations of the first aspect, configuring the target index node to point to the file data of the first file includes: updating index information in the target index node to the first index information. In this way, the index information in the target index node is updated to the first index information, so that the target index node can directly point to the file data of the first file.

According to any one of the first aspect and the foregoing implementations of the first aspect, configuring the target index node to point to the file data of the first file includes: The electronic device updates index information in the target index node to target index information, and copies the file data of the first file to a storage location to which the target index information points; and the electronic device deletes the file data of the first file. In this way, the file data of the first file is copied, and an index in the target index node is configured to point to the copied data of the first file. As a result, when reading or writing a file, the memory can find corresponding data via the index in the target index node.

According to any one of the first aspect and the foregoing implementations of the first aspect, the method further includes: detecting that a third file and the first file are duplicate files, and associating a third index node of the third file with the target index node; and deleting file data of the third file. In this way, in an embodiment of this application, deduplication of a plurality of duplicate files can be implemented. Index nodes of the plurality of duplicate files are associated with the target index node, and duplicate data is deleted. This can effectively reduce space occupied by redundant data.

According to a second aspect, an embodiment of this application provides a data processing method. The method includes: An electronic device obtains first indication information from a first application, where the first indication information indicates to read data to which a second index node of a second file points; and in response to the first indication information, the electronic device detects that the second index node is associated with a target index node, and reads first target data to which the target index node points, where the first target data is file data of a first file, the first file and the second file are duplicate files, and a first index node of the first file is associated with the target index node.

In this way, when processing the duplicate files, the electronic device associates the index nodes of the duplicate files with the newly generated target index node, and deletes file data of a duplicate file, to reduce storage space occupied by redundant data, thereby improving storage space utilization. In addition, in a manner of associating the index nodes of the files with the target index node, imperception for an upper-layer application can be implemented. In other words, for an upper-layer application, during data reading, the upper-layer application may still indicate the electronic device to find data based on the index nodes of the files, and the electronic device may perform conversion between the index nodes based on the association relationships between the index nodes and the target index node, to find corresponding data based on the target index node. In addition, in an embodiment of this application, because the index nodes are associated with the target index node, if the upper-layer application queries content in an index node, information such as a type of recorded data in the content in the index node remains unchanged. Therefore, for the upper-layer application, the index node remains unchanged. Further, the information such as the type in the index node remains unchanged, and correspondingly, when the upper-layer application reads or writes data, a data type presented by the index node is still the same as that before, and remains unchanged. This avoids a problem of a data reading or writing failure caused by a modification of data in the index node.

In an embodiment of this application, the electronic device deletes file data of a duplicate file, for example, the second file. Because the second index node is associated with the target index node, the electronic device can still read the file data via an association relationship between the index node and the target index node. For example, file data of a first picture in a gallery application is the same as that of a second picture in a chat application. In an embodiment of this application, an index node of the first picture and an index node of the second picture are both associated with a target index node. The target index node points to the file data of the first picture, and the file data of the second picture is deleted. In this way, storage space occupied by same data in the second picture as that in the first picture is reduced. In addition, when the chat application needs to read the second picture or the gallery application needs to read the first picture, corresponding file data may be found via the target index node.

According to the second aspect, identification information of the first index node is associated with identification information of the target index node, and identification information of the second index node is associated with the identification information of the target index node.

According to any one of the second aspect and the foregoing implementations of the second aspect, identification information is identity ID information or address information of an index node.

According to any one of the second aspect and the foregoing implementations of the second aspect, the method further includes: The electronic device receives second indication information from a second application, where the second indication information indicates to read data to which the first index node of the first file points; and in response to the second indication information, the electronic device detects that the first index node is associated with the target index node, and reads the first target data to which the target index node points. In this way, in an embodiment of this application, both the first index node and the second index node are associated with the target index node. Correspondingly, when the electronic device needs to read the first index node or the second index node, the electronic device may read corresponding data via the target index node. In other words, the first index node and the second index node point to same data. This effectively reduces occupied space and improves storage space utilization.

According to any one of the second aspect and the foregoing implementations of the second aspect, if the first indication information indicates to read data to which first index information in the second index node of the second file points, reading the first target data to which the target index node points includes: The electronic device detects, based on the first indication information, that the first index information is null, and obtains target index information that is in the target index node and that corresponds to the first index information; and the electronic device reads the first target data to which the target index information points. In this way, in the index node associated with the target index, the index information corresponding to the target index node is null. In other words, a location of the index information still exists, and the index information corresponds to the index information in the target index node. In this way, the upper-layer application may still indicate to read the second index node. In other words, for the upper-layer application, the index information in the second index node still exists, and the electronic device may perform conversion on the index information, to query corresponding index information in the target index node and read the data pointed to.

According to any one of the second aspect and the foregoing implementations of the second aspect, the method further includes: The electronic device obtains third indication information from the first application, where the third indication information indicates to read data to which second index information in the second index node of the second file points; in response to third indication information, the electronic device detects that the second index node is associated with the target index node, and further detects whether the second index information is null; and the electronic device detects that the second index information is not null, and reads second target data to which the second index information points. The second target data is the file data of the second file, and the target data is different from the file data of the first file. In this way, the deduplication method in an embodiment of this application may further be applied to processing of similar files, namely, files whose data that is partially the same. The index node of the second file may be associated with the target index node, and the second index node may further point to data different from that of the first file. This reduces storage space occupied by redundant data and further reserves a part of data that is in the second file and that is different from that in the first file.

According to any one of the second aspect and the foregoing implementations of the second aspect, the first index node includes a first key. The target index node includes the first key. The second index node includes a second key. The file data of the first file is generated through encryption based on the first key, and the file data of the second file is generated based on the second key.

According to any one of the second aspect and the foregoing implementations of the second aspect, the method further includes: inputting the first target data to the first application.

According to any one of the second aspect and the foregoing implementations of the second aspect, the method further includes: receiving fourth indication information from the first application, where the fourth indication information indicates to write new data into the second file; and in response to the fourth indication information, writing the new data into the file data of the second file, where the second index node points to the new data, and the second index node is still associated with the target index node. For an effect, refer to related content in the first aspect. Details are not described herein again.

According to the second aspect and any one of the foregoing implementations of the second aspect, before the first indication information from the first application is obtained, the method further includes: detecting that a first file and a second file are duplicate files, and generating a target index node, where a first index node of the first file points to file data of the first file, and a second index node of the second file points to file data of the second file; configuring the target index node to point to the file data of the first file; associating the first index node with the target index node and associating the second index node with the target index node; and deleting the file data of the second file. For an effect, refer to related content in the first aspect. Details are not described herein again.

According to a third aspect, an embodiment of this application provides an electronic device. The electronic device includes one or more processors, a memory, and one or more computer programs. The one or more computer programs are stored in the memory. When the computer program is executed by the one or more processors, the electronic device is configured to execute instructions for the method according to any one of the first aspect and the possible implementations of the first aspect.

According to a fourth aspect, an embodiment of this application provides an electronic device. The electronic device includes one or more processors, a memory, and one or more computer programs. The one or more computer programs are stored in the memory. When the computer program is executed by the one or more processors, the electronic device is configured to execute instructions for the method according to any one of the second aspect and the possible implementations of the second aspect.

According to a fifth aspect, an embodiment of this application provides a computer-readable medium, configured to store a computer program. The computer program includes instructions used to perform the method according to any one of the first aspect and the possible implementations of the first aspect.

According to a sixth aspect, an embodiment of this application provides a computer-readable medium, configured to store a computer program. The computer program includes instructions used to perform the method according to any one of the second aspect and the possible implementations of the second aspect.

According to a seventh aspect, an embodiment of this application provides a computer program. The computer program includes instructions used to perform the method according to any one of the first aspect and the possible implementations of the first aspect.

According to an eighth aspect, an embodiment of this application provides a computer program. The computer program includes instructions used to perform the method according to any one of the second aspect and the possible implementations of the second aspect.

According to a ninth aspect, an embodiment of this application provides a chip, including one or more interface circuits and one or more processors. The interface circuit is configured to: receive a signal from a memory of an electronic device, and send the signal to the processor. The signal includes computer instructions stored in the memory. When the processor executes the computer instructions, the electronic device is configured to execute instructions for the method according to any one of the first aspect and the possible implementations of the first aspect.

According to a tenth aspect, an embodiment of this application provides a chip, including one or more interface circuits and one or more processors. The interface circuit is configured to: receive a signal from a memory of an electronic device, and send the signal to the processor. The signal includes computer instructions stored in the memory. When the processor executes the computer instructions, the electronic device is configured to execute instructions for the method according to any one of the first aspect and the possible implementation of the first aspect.

BRIEF DESCRIPTION OF DRAWINGS

FIG. 5a (1) to FIG. 5a (4) are diagrams of an example of a user interface;

DESCRIPTION OF EMBODIMENTS

The following clearly and completely describes the technical solutions in embodiments of this application with reference to the accompanying drawings in embodiments of this application. It is clear that the described embodiments are some but not all of embodiments of this application. All other embodiments obtained by a person of ordinary skill in the art based on embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and the like are used to distinguish between different objects, but are not used to describe a specific order of the objects. For example, a first target object, a second target object, and the like are used to distinguish between different target objects, but are not used to describe a specific order of the target objects.

In addition, in embodiments of this application, the word "example" or "for example" is used for representing giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

In the descriptions of embodiments of this application, unless otherwise specified, "a plurality of" means two or more. For example, a plurality of processing units mean two or more processing units, and a plurality of systems mean two or more systems.

Figure 1:
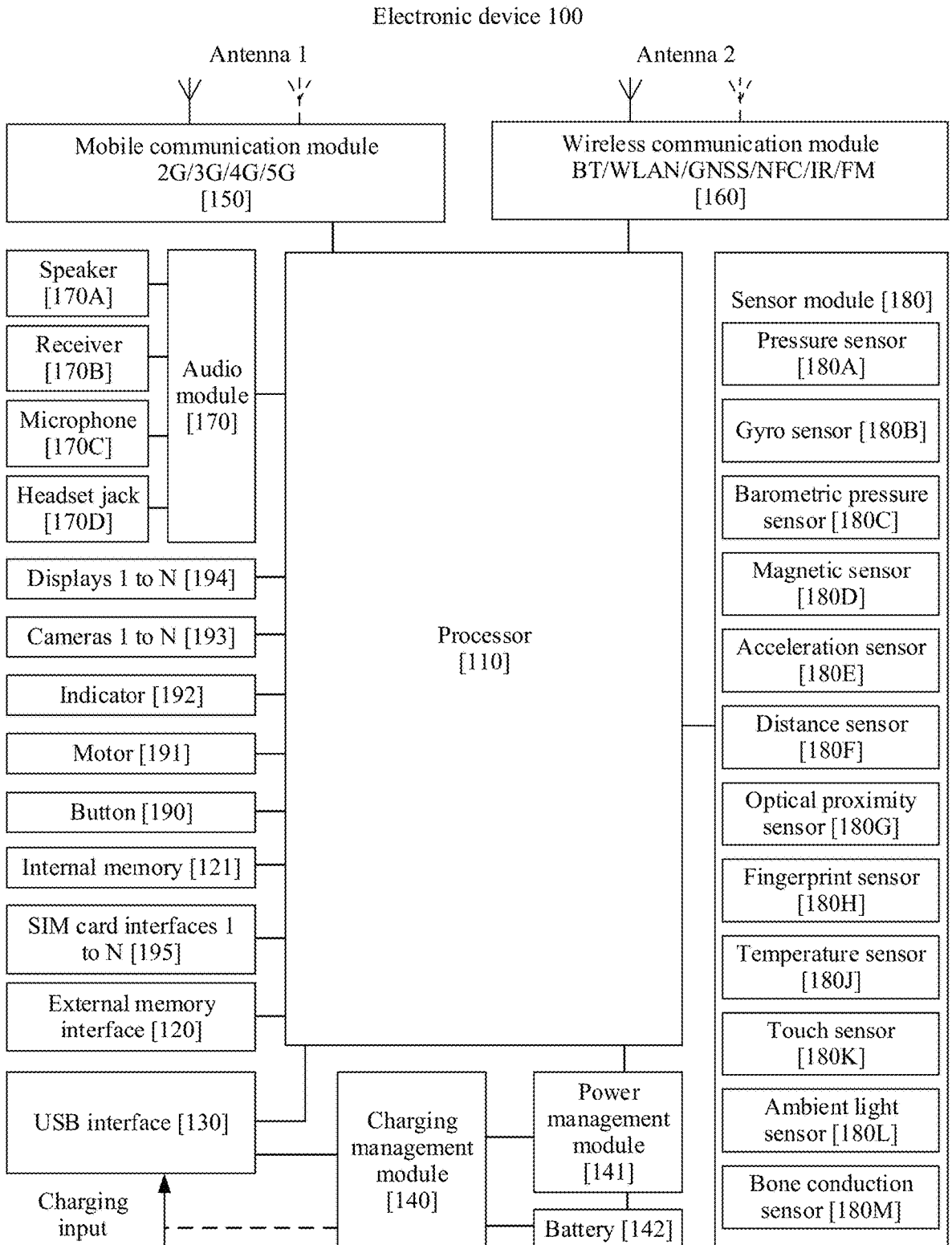
FIG. 1 is a diagram of an example of a hardware structure of an electronic device.

FIG. 1 is a diagram of a structure of an electronic device 100. It should be understood that the electronic device 100 shown in FIG. 1 is merely an example of the electronic device, and the electronic device 100 may have more or fewer components than those shown in the figure, or may combine two or more components, or may have different component configurations. The various components shown in FIG. 1 may be implemented in hardware including one or more signal processing circuits and/or application-specific integrated circuits, software, or a combination of hardware and software. It should be noted that in an embodiment of this application, only an example in which the electronic device is a mobile phone is used for description. In another embodiment, a data processing method in embodiments of this application may alternatively be applied to any device, for example, a tablet, a wearable device, a smart home device, or a server. This is not limited in this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

The charging management module 140 is configured to receive a charging input from a charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input from the battery 142 and/or the charging management module 140, to supply power to the processor 110, the internal memory 121, the external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 and at least some modules of the processor 110 may be disposed in a same component.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near-field communication (NFC) technology, an infrared (IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device can communicate with a network and another device by using a wireless communication technology.

The electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The camera 193 is configured to capture a static image or a video. An optical image of an object is generated through the lens, and is projected onto the light-sensitive element. The light-sensitive element may be a charge-coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The external memory interface 120 may be configured to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. For example, the processor 110 may perform the data processing method in an embodiment of this application by running the instructions stored in the internal memory 121, that is, may deduplicate data in the electronic device. The internal memory 121 may include a program storage area and a data storage area. The program storage area may store an operating system, an application required by at least one function (for example, a voice playing function or an image playing function), and the like. The data storage area may store data (which may also be referred to as a file, for example, a picture, audio data, or a phone book) created during use of the electronic device 100, and the like. In addition, the internal memory 121 may include a high-speed random access memory, and may further include a non-volatile memory, for example, at least one magnetic disk storage component, a flash memory component, and a universal flash storage (UFS).

The electronic device 100 may implement an audio function through the audio module 170, the speaker 170A, the receiver 170B, the microphone 170C, the headset jack 170D, the application processor, and the like, for example, music playing and sound recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

A software system of the electronic device 100 may use a layered architecture, an event-driven architecture, a micro-kernel architecture, a micro service architecture, or a cloud architecture. In embodiments of this application, an Android system of a layered architecture is used as an example to illustrate a software structure of the electronic device 100.

Figure 2:
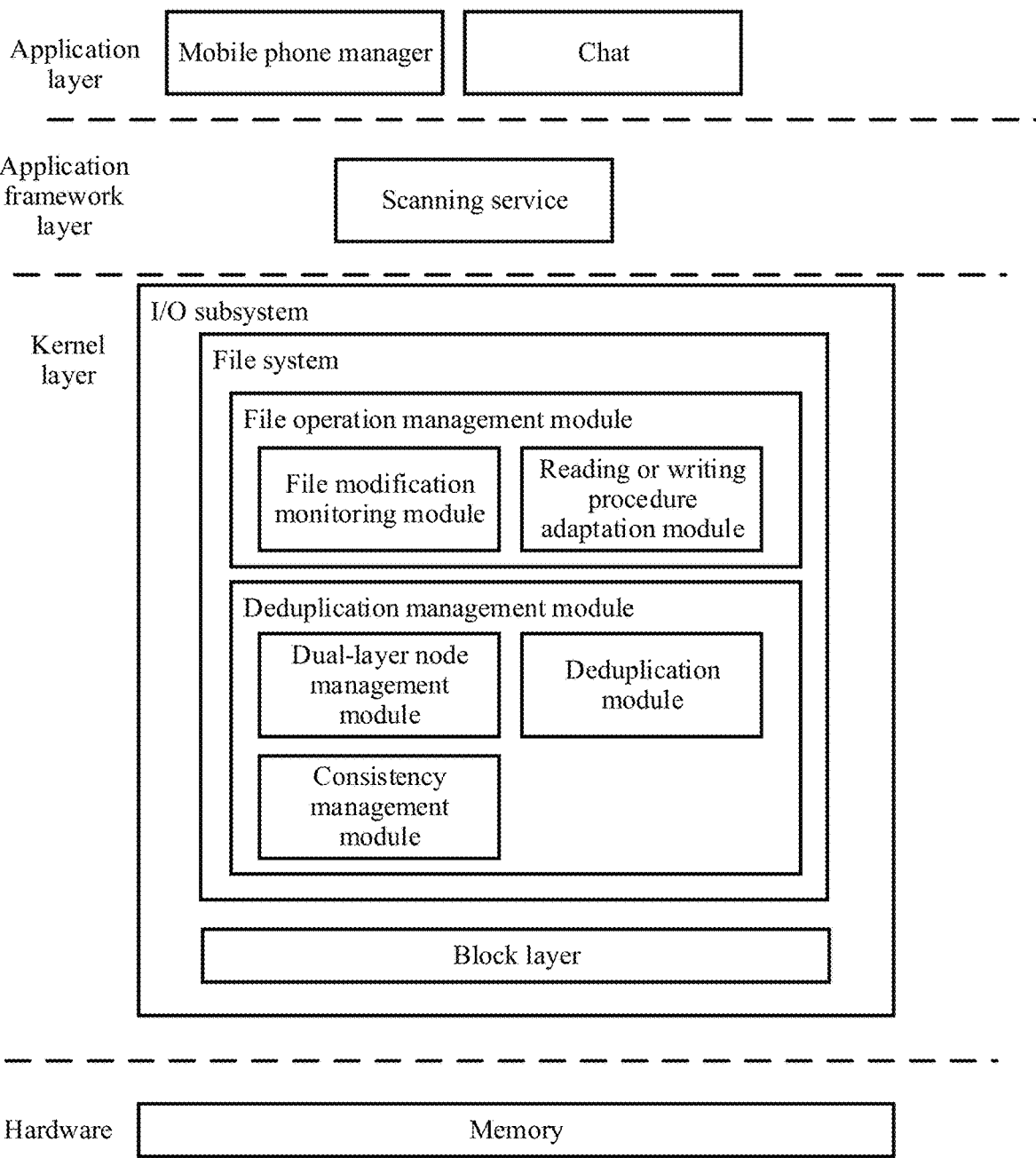
FIG. 2 is a diagram of an example of a software structure of an electronic device.

FIG. 2 is a block diagram of the software structure of the electronic device 100 according to an embodiment of this application.

In a layered architecture of the electronic device 100, software is divided into several layers, and each layer has a clear role and task. The layers communicate with each other through a software interface. As shown in FIG. 2, the system of the electronic device 100 may include but is not limited to an application layer, an application framework layer, and a kernel layer. It should be noted that the structure shown in FIG. 2 does not constitute a specific limitation on the electronic device 100. In some other embodiments of this application, the electronic device 100 may include more or fewer layers and more or fewer components than those shown in the figure, or combine some components, or split some components, or have different component arrangements. This is not limited in this application.

With reference to FIG. 2, the application layer includes but is not limited to applications such as a mobile phone manager and a chat application. For example, a mobile phone manager application may provide a user management interface, so that a user manages a mobile phone. For example, the mobile phone manager may provide a data cleanup function, to clear redundant data in the mobile phone. In an embodiment of this application, the redundant data is same or similar data. This improves storage space utilization. Certainly, the mobile phone manager may further provide another function, for example, including performance optimization. This is not limited in this application.

The application framework layer provides an application programming interface (API) and a programming framework for an application at the application layer. The application framework layer includes some predefined functions.

For example, the application framework layer may include but is not limited to a window manager, a content provider, a view system, a phone manager, a resource manager, a notification manager, and a scanning service.

The window manager is used to manage a window program. The window manager may obtain a size of a display, determine whether there is a status bar, perform screen locking, take a screenshot, and the like.

The content provider is used to store and obtain data, and enable the data to be accessed by an application. The data may include a video, an image, an audio, calls that are made and answered, a browsing history and a bookmark, a phone book, and the like.

The view system includes visible controls such as a control for displaying a text and a control for displaying a picture. The view system may be used to construct an application. A display interface may include one or more views. For example, a display interface including an SMS message notification icon may include a text display view and a picture display view.

The phone manager is used to provide a communication function of the electronic device 100, for example, management of a call status (including answering, declining, or the like).

The resource manager provides various resources such as a localized character string, an icon, a picture, a layout file, and a video file for an application.

The notification manager configures an application to display notification information in a status bar, and may be used to convey a notification message. The notification manager may automatically disappear after a short stay, without requiring a user interaction. For example, the notification manager is used to notify download completion, provide a message notification, and the like. The notification manager may alternatively be a notification that appears in a top status bar of the system in a form of a graph or a scroll bar text, for example, a notification of an application that is run in a background, or may be a notification that appears on the screen in a form of a dialog window. For example, text information is displayed in the status bar, a prompt tone is sent, the electronic device vibrates, or an indicator light blinks.

The scanning service is used to scan duplicate files in a memory. In an embodiment of this application, the duplicate files may be optionally at least two files whose data is completely the same, or may be at least two files whose data is similar. For example, a threshold may be set for similarity of files. For example, if 80% (which may be set based on an actual requirement, and is not limited in this application) of data in two files is the same, the two files are similar files. For a specific scanning process of the scanning service, refer to related content in embodiments of a conventional technology. Details are not described in this application.

The kernel layer is a layer between hardware and software. The kernel layer includes but is not limited to a display driver, a camera driver, an audio driver, a sensor driver, an I/O subsystem, and the like.

Figure 3:
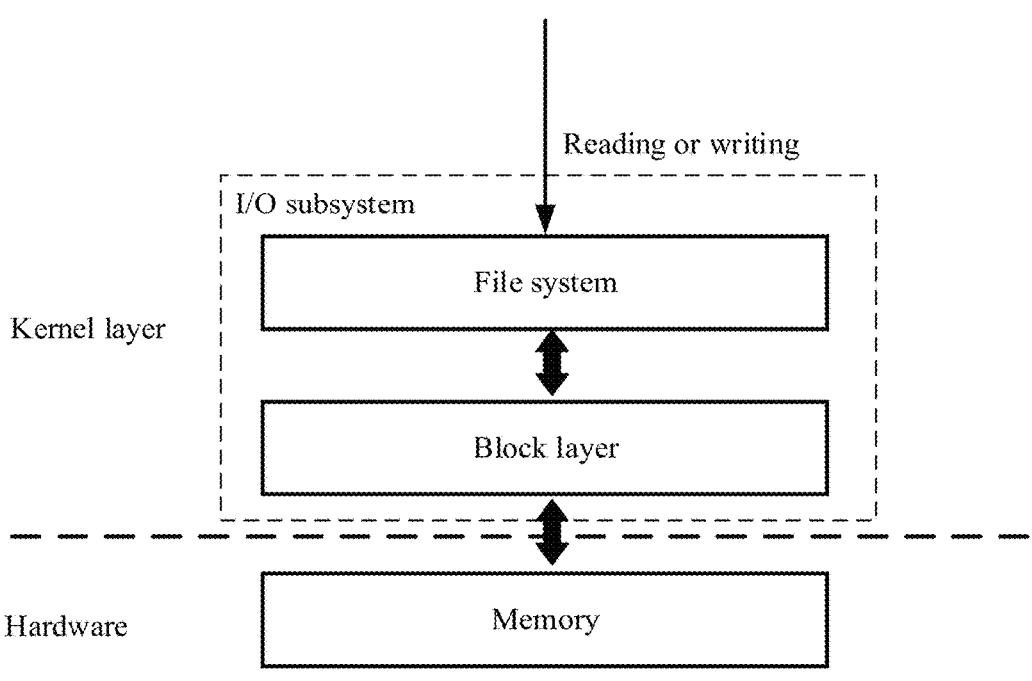
FIG. 3 is a diagram of an example of data reading or writing.

For example, the I/O subsystem includes but is not limited to a file system and a block layer. The I/O subsystem is used to process data in the memory, including but not limited to reading data, writing data, removing duplicate data (deduplication for short), and the like. FIG. 3 is a diagram of an example of data reading or writing. With reference to FIG. 3, for example, in response to a reading or writing instruction (including a reading instruction or a writing instruction) from an upper-layer application (for example, a chat application), a file system reads data from a memory or writes data into a memory through a block layer. Optionally, the file system may be understood as being used to transmit a control instruction. For example, the file system receives the reading or writing instruction from the chat application, and stores data of the chat application in a cache. The cache may be located at a kernel layer. For example, the file system may perform corresponding processing on the data in the cache, and after processing is completed, store the data in the cache into the memory through the block layer. In other words, the file system may be understood as controlling the data in the cache and the memory, and the data is actually stored in the cache and/or the memory.

Figure 4:
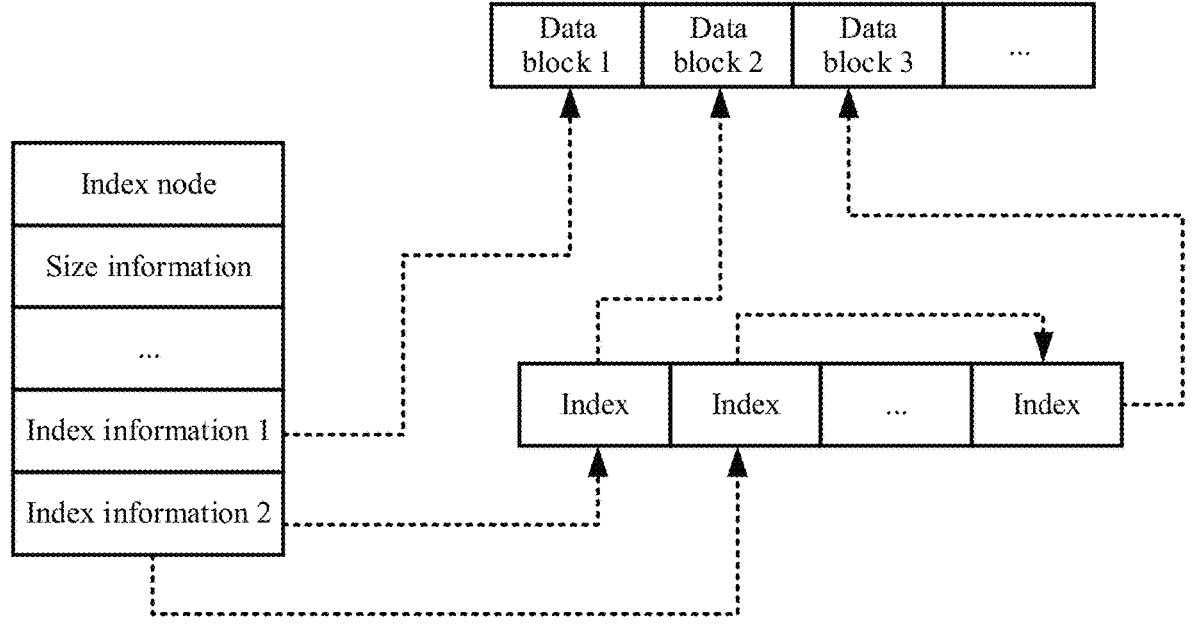
FIG. 4 is a diagram of an example of an index node.

For example, the data in an embodiment of this application includes metadata and file data (which may also be referred to as actual data or file content). The metadata is usually stored in an index node of the memory. FIG. 4 is a diagram of an example of an index node. With reference to FIG. 4, the index node includes one or more pieces of metadata, and each piece of metadata includes information used to describe file data, for example, including but not limited to size information, type information, creation or modification time information, index information, and a key. The size information is used to describe a size of file data. The index information is used to describe a storage location of file data. The type information is used to describe a type of file data to which the index information points. The key is used to encrypt or decrypt file data. Optionally, the key may be generated based on a directory (for a concept, refer to the foregoing descriptions). For a generation manner, refer to an embodiment in a conventional technology. This is not limited in this application.

Still with reference to FIG. 4, the index information includes but is not limited to index information 1 and index information 2. That the index information 1 points to a data block 1 may be understood as that the index information 1 corresponds to the data block 1. In other words, a file system may find data in the data block 1 based on the index information 1. The index information 2 may include a plurality of indexes, and each index may point to a data block or another index. In other words, an index in the index information may point to data directly (that is, directly point to the data) or indirectly (that is, point to data via at least one of other indexes).

It should be noted that the file system in an embodiment of this application may be an flash-friendly file system (F2FS). The technical solutions in embodiments of this application may also be applied to another system and memory structure for searching for file data via an index. This is not limited in this application.

Still with reference to FIG. 2, an embodiment of this application, the file system includes but is not limited to a file operation management module and a deduplication management module. The file operation management module includes but is not limited to a file modification monitoring module and a reading or writing procedure adaptation module. The deduplication management module includes but is not limited to a dual-layer node management module, a deduplication module, and a consistency management module.

The file modification monitoring module is used to monitor file data to detect whether the file data is modified.

The reading or writing procedure adaptation module is used to process a procedure of reading or writing file data.

The dual-layer node management module is used to create and manage a dual-layer node. The dual-layer node includes an outer-layer node and an inner-layer node, and details are described in the following embodiments.

The deduplication module is used for deduplication and reverse processing on file data. A specific processing process is described in detail in the following embodiments.

The consistency management module is used for consistency management of file data, to keep consistency of the file data.

For example, FIG. 2 shows hardware included in the electronic device 100, for example, the memory. The memory may be configured to store the data (including the metadata and the file data).

For example, FIG. 5a (1) to FIG. 5a (4) are diagrams of an example of a user interface. With reference to FIG. 5a (1), an interface 501 of a mobile phone manager application includes one or more controls. The controls include but are not limited to a one-touch optimization control, a performance score display control, a cleanup acceleration control 502, a traffic management control, and the like. A user taps the cleanup acceleration control 502 to clean up data in a mobile phone. As shown in FIG. 5a (2), in response to a received user operation, the mobile phone manager application invokes a scanning service to scan duplicate files to obtain duplicate data in a memory. The mobile phone manager application displays the cleanup acceleration interface 503. The cleanup acceleration interface 503 includes but is not limited to one or more controls. The controls include but are not limited to an application data cleanup control, a rarely-used application cleanup control, a duplicate file cleanup control 505, and a targeted cleanup control. Optionally, the dedicated cleanup control includes but is not limited to a picture control 504, a video control, an audio control, a large file control, and the like.

For example, the duplicate file cleanup control 505 may include a quantity of duplicate files, a size of the duplicate files (a total size of all the duplicate files), and a "Clean up"

control. Information such as the quantity of duplicate files is obtained by the mobile phone manager application by using the scanning service. This is not described in the following. For example, the user may tap the "Clean up" control to clean up the duplicate files. For example, the duplicate files may include duplicate files of different types, such as pictures, documents, videos, and compressed packages. In an embodiment of this application, an example in which the user cleans up duplicate picture files is used for description. In another embodiment, a process of cleaning up files such as documents, videos, and compressed packages is similar to a process of cleaning up pictures in this embodiment of this application. Examples are not given one by one for description in this application.

With reference to FIG. 5a (2), the user taps the picture control 504 to clean up duplicate pictures in the mobile phone. As shown in FIG. 5a (3), in response to a received user operation, the mobile phone displays a picture display interface 506 (which may also be referred to as a duplicate picture cleanup interface). The picture display interface 506 includes but is not limited to a similar picture cleanup control 507, a fuzzy picture cleanup control, and the like. For example, a quantity of similar pictures may be displayed in the similar picture cleanup control 507. Optionally, the similar pictures are similar to the duplicate data described above. To be specific, at least two completely same pictures may be similar pictures, and at least two pictures with 80% (which may be set based on an actual requirement) of similar content may also be referred to as similar pictures. In an embodiment of this application, the similar pictures may also be referred to as duplicate pictures. This is not described in the following.

For example, the user taps the similar picture cleanup control 507 to clear the similar pictures. As shown in FIG. 5a (4), in response to a received user operation, the mobile phone manager displays a similar picture cleanup display interface 508. The similar picture cleanup display interface 508 includes but is not limited to a similar picture cleanup box 509 and a deduplication option 510. For example, the similar picture cleanup box 509 includes the similar pictures detected by using the scanning service and an optimal picture reservation option 5091. For example, the mobile phone manager may display, in groups, the similar pictures detected by using the scanning service. For example, the similar picture cleanup box 509 includes a similar picture group 5092 and a similar picture group 5093. The similar picture group 5092 includes two items of (namely, two) same or similar pictures, that is, includes a picture 5092a and a picture 5092b. In other words, picture content of the picture 5092a and that of the picture 5092b are the same as or similar. The similar picture group 5093 includes three items of same or similar pictures, that is, includes a picture 5093a, a picture 5093b, and a picture 5093c. In other words, picture content of the picture 5093a as well as that of the picture 5093b and that of the picture 5093c are the same as or similar. The same pictures mean that 100% of picture content is consistent, and the similar pictures mean that 80% (which may be set based on an actual requirement) of picture content is consistent. This is not described again in the following. It should be noted that the picture content may include but is not limited to image data and image attribute information. The image attribute information includes but is not limited to time, an author, a source, and the like. This is not limited in this application.

For example, pictures in a group of similar pictures belong to an application may also be understood as that the pictures belong to a same folder or different folders. For example, the user downloads the picture 5092b from a chat application. The mobile phone stores the picture 5092b in a specified folder of the chat application. For example, a storage path of the picture 5092b is "/sdcard/liaotian/chat/". Correspondingly, the mobile phone further stores, in a gallery application, the picture downloaded from the chat application. For example, a storage path of the picture 5092a is "/sdcard/DCIM/Camera/". To be specific, two pictures whose picture content is completely the same are stored in a folder of the gallery application and a folder of the chat application.

Still with reference to FIG. 5a (4), for example, the user may tap the optimal picture reservation option 5091 to automatically reserve an optimal picture. Certainly, in another embodiment, the user may alternatively choose manually to reserve at least one picture in each group of pictures. This is not limited in this application. Optionally, the user may alternatively delete all the similar pictures. In an embodiment of this application, only deduplication on the similar pictures is used as an example for description. For a picture deletion processing process, refer to an existing embodiment. This is not limited in this application.

For example, in response to a received operation of tapping the optimal picture reservation option 5091 by the user, the mobile phone manager may automatically select an optimal picture in each group of pictures. For a specific selection rule, refer to related content in an embodiment of a conventional technology. Details are not described in this application. For example, the mobile phone manager selects the picture 5092a in the similar picture group 5092 as an optimal picture, and selects the picture 5903b in the similar picture group 5903 as an optimal picture. Correspondingly, other non-optimal pictures (including the picture 5902a, the picture 5903a, and the picture 5903c) are selected, and the user may tap the deduplication option 510 to deduplicate the selected non-optimal pictures.

Figure 6A:
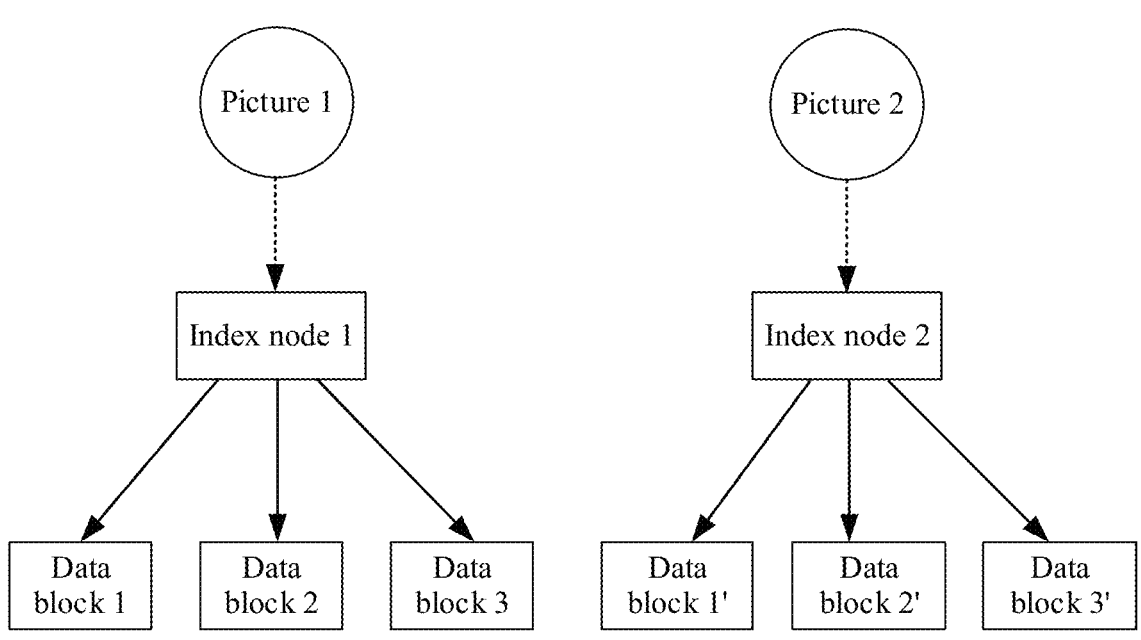
FIG. 6*a* and FIG. 6*b* are diagrams of an example of a deduplication procedure according to an embodiment in a conventional technology.
Figure 6B:
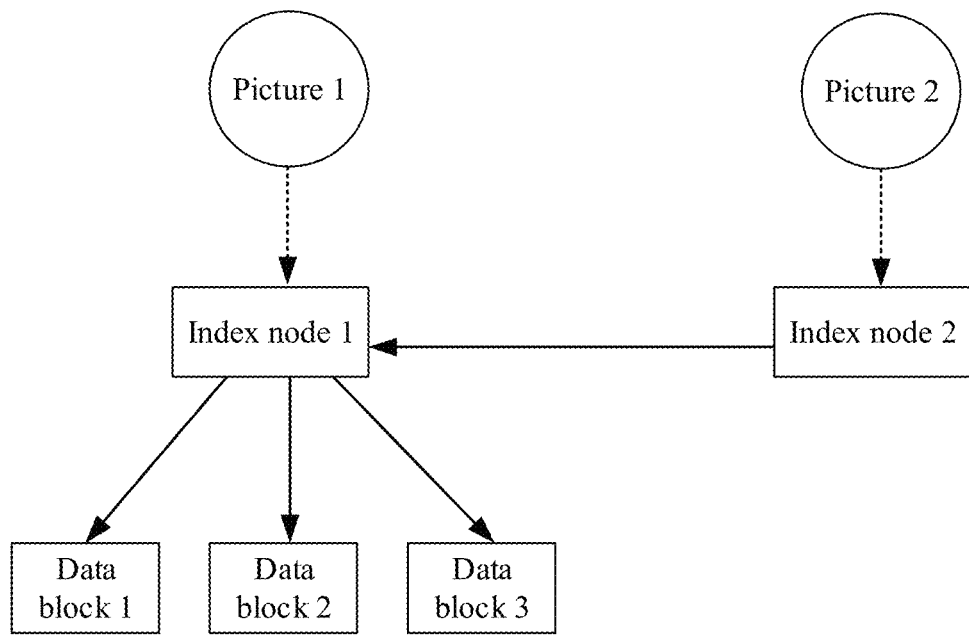

For example, FIG. 6a is a diagram of an example of a deduplication procedure according to an embodiment in a conventional technology. With reference to FIG. 6a, a picture 1 (for example, the picture 5902a) corresponds to an index node 1, and a picture 2 (for example, the picture 5902b) corresponds to an index node 2. In other words, a file system may obtain, based on the index node 1, data corresponding to the picture 1 in a memory, and the file system may obtain, based on the index node 2, data corresponding to the picture 2 in the memory. For a related concept of the index node, refer to the foregoing description. Details are not described herein again. The index node 1 points to a data block 1, a data block 2, and a data block 3. The index node 2 points to a data block 1', and a data block 2', and a data block 3'. For a pointing relationship between an index node and a data block, refer to the descriptions of FIG. 4. Details are not described herein again. For example, the picture 1 and the picture 2 are pictures whose picture content is the same. In other words, data in the data block 1 is the same as data in the data block 1', data in the data block 2 is the same as data in the data block 2', and data in the data block 3 is the same as data in the data block 3'. In a deduplication process, the file system creates a temporary file of the picture 1 by using a link command. For example, the temporary file is/sdcard/liaotian/chat/.2_tmp.jpeg, and the temporary file includes a temporary index node. The temporary index node is associated with a path of the picture 1, to point to the index node 1. The file system replaces data of a to-be-deduplicated file (for example, the picture 2, which is denoted as/sdcard/liaotian/chat/2.jpeg) with data of the temporary file/sdcard/liaotian/chat/.2_tmp.jpeg. To be specific, as shown in FIG.

Figure 5B:
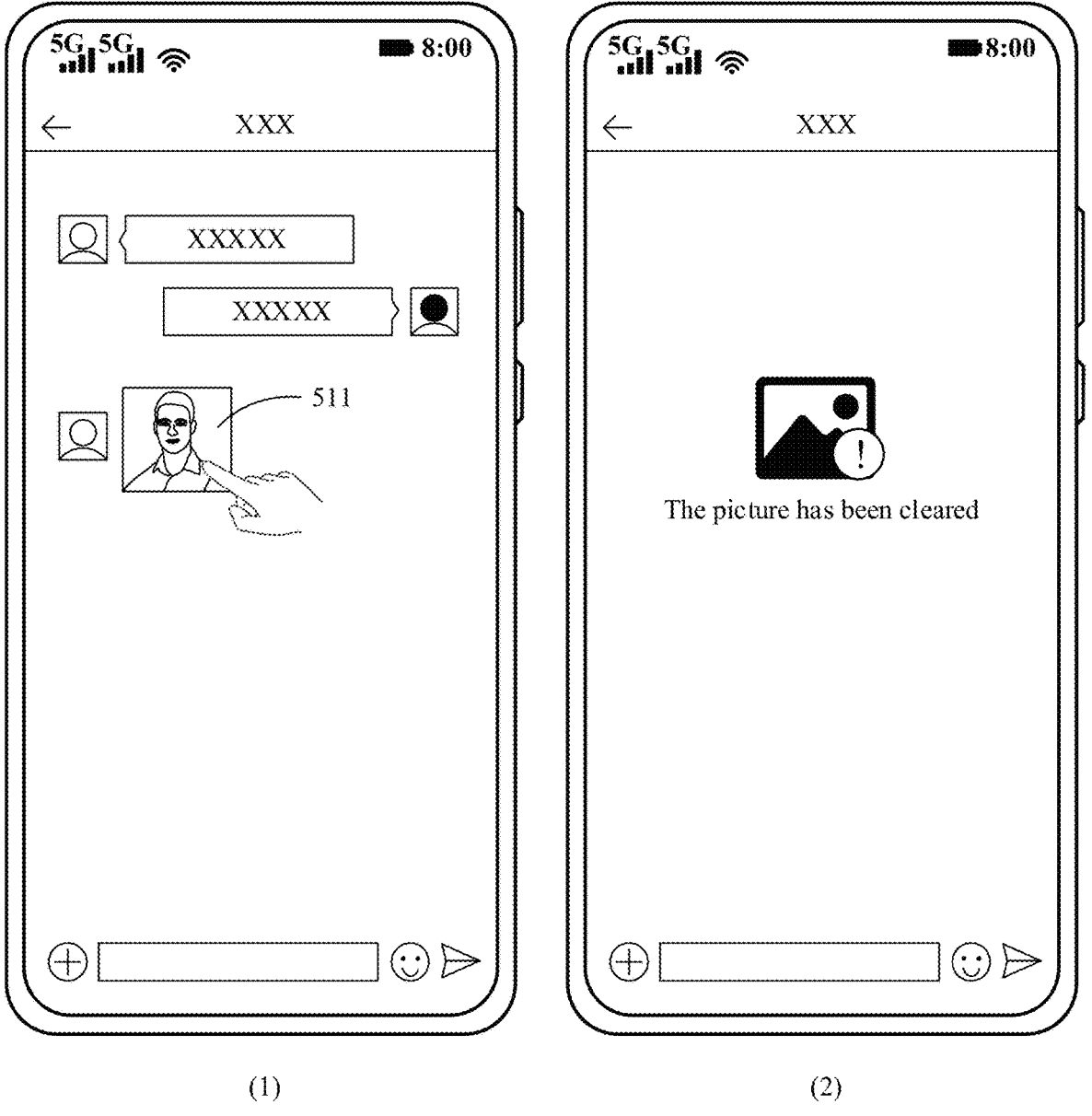
FIG. 5b is a diagram of an example of a user interface.

6*b*, the file system configures the index node 2 of the picture 2 to point to the index node 1, and configures the temporary index node of the temporary file to point to a data block corresponding to the picture 2 (including the data block 1', the data block 2', and the data block 3'). The file system deletes the temporary file, that is, deletes the index of the temporary file and corresponding data (including the data block 1', the data block 2', and the data block 3') to release storage space. In this example, if the file system reads or writes data corresponding to the picture 2 in response to an indication from the chat application, the file system may search for the corresponding data based on an index of the picture 2. The index node 2 points to the index node 1 in a soft link manner. In other words, a picture type of the data to which the index node 2 points changes from an original picture type (namely, a type of the data block 1' to the data block 3') to a soft link type. As a result, the application may fail to identify that the picture 2 is a file of a picture type, and the picture cannot be displayed or opened properly. For example, FIG. 5*b* is a diagram of an example of a user interface. With reference to (1) in FIG. 5*b*, on a display interface of the chat application, the user may tap a thumbnail 511 corresponding to the picture 2, to open the picture 2. In response to a received user operation, the chat application sends reading indication information to the file system. In response to the received reading indication information, the file system reads the index node 2 of the picture 2. If the file system learns, through reading, that the index node 2 is a node of the soft link type, the node type is fed back to the chat application. When detecting that the file type is the soft link type, which is inconsistent with the original picture type, the chat application displays picture exception prompt information, as shown in (2) in FIG. 5*b*. In addition, in this example, an index of the picture 2 points to an index of the picture 1. In other words, indexes of the two files point to the same data. If the user modifies data of one picture, data of the other picture is also modified when the other picture is displayed. In other words, an upper-layer application perceives a picture modification, resulting in modification interference between the duplicate pictures. In addition, in this example, if the picture 1 or the picture 2 is modified in the deduplication process, there is no corresponding technology in the conventional technology to resolve the problem.

Figure 7A:
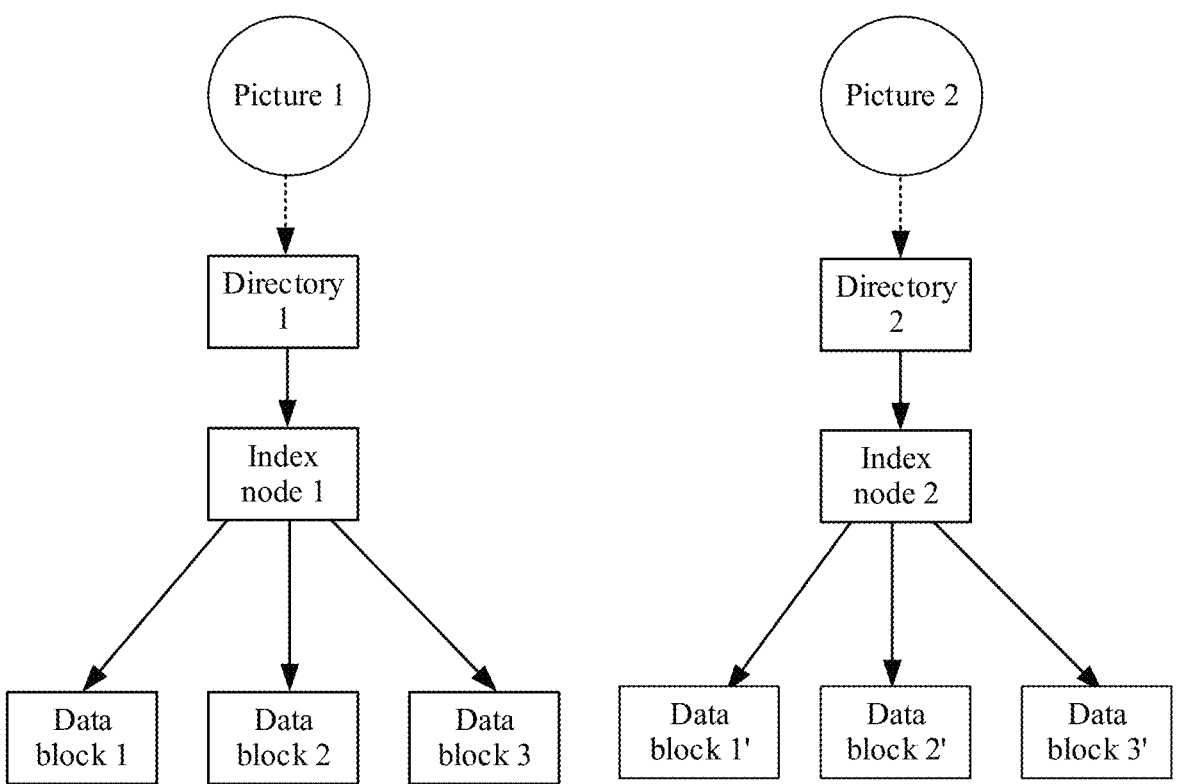
FIG. 7*a* and FIG. 7*b* are diagrams of an example of a deduplication procedure according to an embodiment in another conventional technology.
Figure 7B:
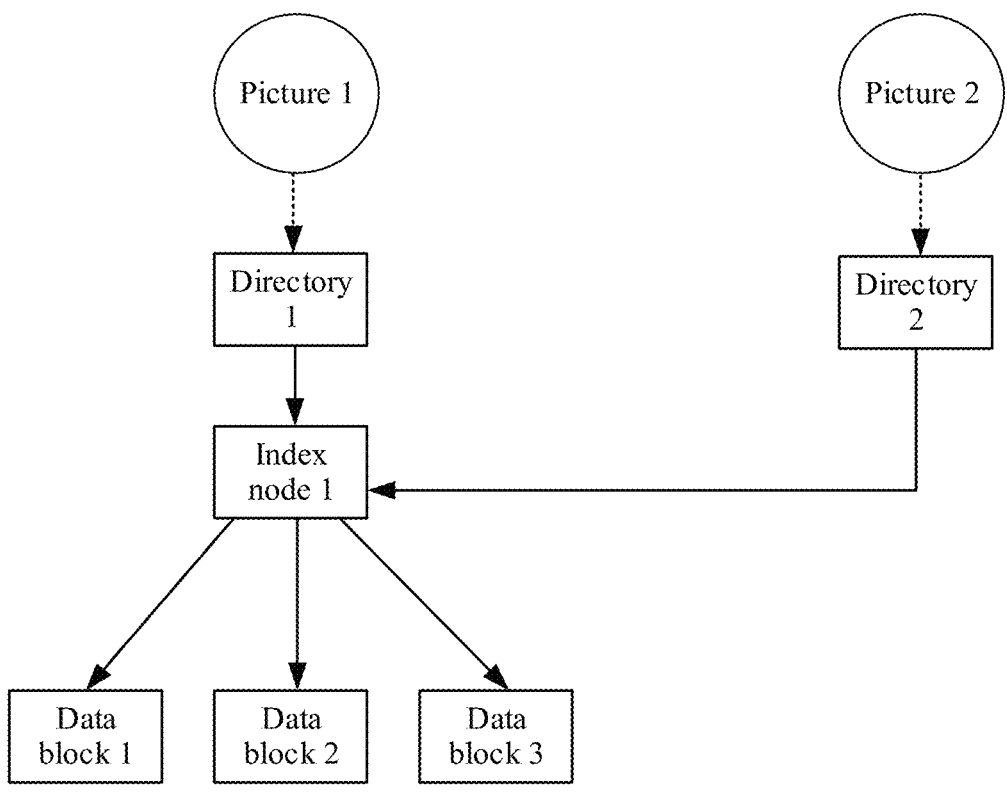

FIG. 7*a* and FIG. 7*b* are diagrams of an example of a deduplication procedure according to an embodiment in another conventional technology. With reference to FIG. 7*a*, a picture 1 corresponds to a directory 1, and the directory 1 corresponds to an index node 1. The index node points to a data block 1, a data block 2, and a data block 3. The directory may be understood as a file similar to the index node. A corresponding index node may be found by using a directory file, and then corresponding data is found based on the index node. For example, a picture 2 corresponds to a directory 2, and the directory 2 corresponds to an index node 2. The index node 2 points to a data block 1', a data block 2', and a data block 3'. For example, a file system may create a temporary file/sdcard/liaotian/chat/.2_tmp.jpeg by using a link command. A directory of the temporary file points to the index node 1. The file system replaces the picture 2 with the temporary file. In other words, the directory 2 of the picture 2 points to the index node 1 in a hard link manner, and the directory of the temporary file points to the index node 2. The file system deletes the temporary file and data (including the directory, the index node 2, and pointed data) of the temporary file to release storage space. In this example, a data modification problem generated in the deduplication process and a data modification interference problem generated after deduplication is completed also exist.

An embodiment of this application provides a data processing method. A dual-layer node index mechanism is introduced, to add, to an original index node, an inner-layer index node that is invisible (that is, imperceptible) to a user (namely, an upper-layer application). In other words, for the upper-layer application, a type of data and content of the data of the upper-layer application remain unchanged, and the upper-layer application may still indicate a file system to read or write the data in an original reading or writing manner. The file system may implement automatic conversion based on a correspondence in a dual-layer node, to find a corresponding index based on a correspondence between an index in an inner-layer node and an index in an outer-layer node, and find corresponding data based on the index. In addition, in an embodiment of this application, type information stored in an outer-layer index node is unchanged. In this way, when an application reads or writes data, corresponding data can be correctly read or written without being limited by a type of the outer-layer index node. This effectively improves reliability and security of data deduplication.

Figure 8:
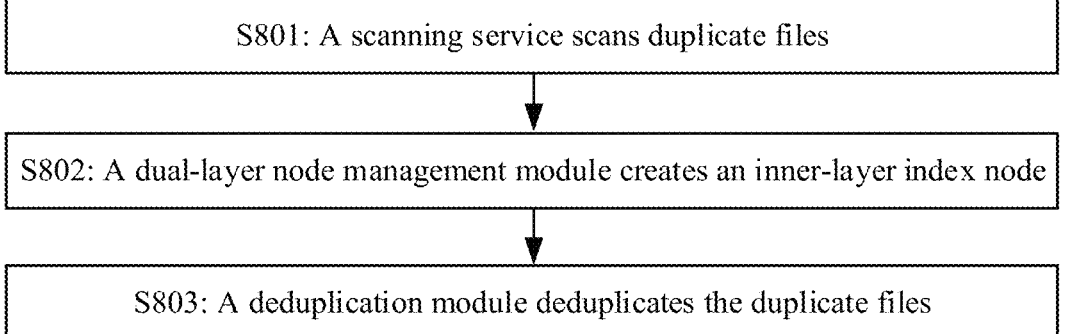
FIG. 8 is a diagram of an example of a data processing procedure.

FIG. 8 is a diagram of an example of a data processing procedure. With reference to FIG. 8, the procedure specifically includes but is not limited to the following steps.

S801: A scanning service scans duplicate files.

For example, a user may trigger a deduplication procedure by using a mobile phone manager service. The mobile phone manager service may invoke the scanning service to scan the duplicate files in a mobile phone. In response to an indication from a mobile phone manager application, the scanning service scans the duplicate files in the mobile phone. For specific descriptions, refer to the descriptions of FIG. 5*a* (1) to FIG. 5*a* (4). Details are not described herein again.

For example, after the scanning service completes scanning, the mobile phone manager application displays a scanning result of the scanning service. For specific descriptions, refer to FIG. 5*a* (1) to FIG. 5*a* (4). Details are not described herein again. In an embodiment of this application, after completing scanning, the scanning service sends monitoring indication information to a file modification monitoring module. The monitoring indication information may include but is not limited to identification information of each detected duplicate file. The identification information may be a file name, or may be a file path. This is not limited in this application. For example, the monitoring indication information indicates the file modification monitoring module to monitor a modification of detected duplicate files, to monitor whether a duplicate file is modified. In response to the received monitoring indication information, the file modification monitoring module monitors each duplicate file, and after detecting that any duplicate file is modified, triggers the scanning service to perform the scanning procedure again.

For example, after the scanning service detects the duplicate files, the user may perform subsequent deduplication procedure on the duplicate files after a period of time. Before a deduplication procedure starts, a duplicate file may be modified. Correspondingly, after detecting that the duplicate file is modified, the file modification monitoring module may notify the scanning service to perform the scanning procedure again. In an example, the scanning service may rescan only modified duplicate files. In another example, the scanning service may rescan all files in a similar file group to which the duplicate file belongs. In still another example, the scanning service may rescan all files in the mobile phone for duplicate files. This is not limited in this application.

It should be noted that, in an embodiment of this application, an example in which the mobile phone manager invokes the scanning service to scan the duplicate files in response to a received user operation of tapping the cleanup acceleration control 502 is used for description. In another embodiment, the mobile phone manager may alternatively trigger the scanning service to scan the duplicate files periodically, or after the mobile phone enters a standby mode, or at any specified time point, to perform the duplicate file scanning procedure in advance. This reduces waiting time of the user.

Optionally, after the file modification monitoring module notifies the scanning service to perform the scanning procedure again, in an example, the scanning service may perform rescanning immediately. In another example, the scanning service may perform rescanning at any moment before S802 is performed. This is not limited in this application.

S802: A dual-layer node management module creates an inner-layer index node.

For example, in a case in which deduplication on the duplicate files is triggered by the user by tapping the deduplication option 510, the mobile phone manager may invoke a deduplication management module in the file system to perform the deduplication procedure. It should be noted that an operation for triggering the deduplication procedure in an embodiment of this application is merely an appropriate example. For example, in another embodiment, the mobile phone may alternatively periodically and automatically trigger the deduplication procedure to improve space utilization. This is not limited in this application.

For example, the dual-layer node management module in the deduplication management module detects whether each similar file group corresponds to an inner-layer index node. It should be noted that, in an embodiment of this application, a single similar file group corresponds to one inner-layer index node. In another embodiment, a single similar file group may alternatively correspond to a plurality of inner-layer index nodes, and a processing process thereof is similar to that of a single inner-layer index node. This is not described again in this application. It should be further noted that a single inner-layer index node can correspond to only one similar file group. In other words, one similar file group may correspond to one or more inner-layer index nodes, but one inner-layer index node can correspond to only one similar file group.

In an example, if the dual-layer node management module detects that the similar file group already corresponds to an inner-layer index node, the dual-layer node management module may indicate the deduplication module to perform a deduplication procedure on files in the similar file group, that is, perform S803.

In another example, if the dual-layer node management module detects that the similar file group does not correspond to an inner-layer index node, the dual-layer node management module creates an inner-layer index node for the similar file group. To be specific, the dual-layer node management module converts a structure of single-layer index node of a source file into a dual-layer index node structure. After creating the inner-layer index node, the dual-layer node management module indicates the deduplication module to perform a deduplication procedure on the files in the similar file group, that is, perform S803.

In a process of creating the inner-layer index node, two different manners may be used. In one manner, the dual-layer node management module creates the inner-layer index node corresponding to the similar file group, and the dual-layer node management module may copy file data of the source file, and copy a part of information in an index node of the source file to the inner-layer index node.

Optionally, the source file may be an optimal picture in each similar picture group in a scenario shown in FIG. 5*a* (1) to FIG. 5*a* (4). Certainly, the source file may alternatively be any file in the similar file group. This is not limited in this application.

Optionally, a part of data in the index node described above is at least one piece of information other than index information in the index node of the source file, for example, may include information such as size information and a key. For example, index information in the inner-layer index node points to the copied file data.

It should be noted that, in the first manner, the data is completely copied. Correspondingly, data in each data block is encrypted based on a key of the source file. In another embodiment, the dual-layer node management module may alternatively generate a new key for the inner-layer index node, and use the new key to encrypt data (namely, original data, which may also be understood as decrypted data) in the data block of the source file. Correspondingly, in a subsequent reading or writing process, the new key is used for encryption and decryption. This is not limited in this application. In an embodiment of this application, only an example in which the inner-layer index node continues to use the key of the index node of the source file is used for description. This is not described again in the following.

For example, in the other manner of creating the inner-layer index node by the dual-layer node management module, after creating the inner-layer index node corresponding to the similar file group, the dual-layer node management module copies all information (including size information, a key, and index information) in the index node of the source file to the inner-layer index node. In other words, the index information in the inner-layer index node points to the file data of the source file.

In this way, the dual-layer node management module creates the inner-layer index node, and associates the index node of the source file with the inner-layer index node, to convert the single-layer index node of the source file into a dual-layer index node that includes the inner-layer index node and an outer-layer index node. The outer-layer index node is the original index node of the source file. It should be noted that, in an embodiment of this application, the outer-layer index node and the inner-layer index node are merely used to better distinguish between the index nodes. In another embodiment, the index node of the source file (a target file in the following) may also be referred to as an inner-layer index node, and the inner-layer index node may also be referred to as an outer-layer index node. The inner-layer index node may also be referred to as a target index node or a conversion index node. This is not limited in this application.

It should be noted that, in a process in which the dual-layer management module performs S802, a consistency management module in the deduplication management module performs consistency check. Optionally, if the consistency management module detects that a consistency exception occurs, the consistency management module indicates the dual-layer management module to perform a rollback, to restore the source file to a status obtained in S801 (that is, before S802), that is, delete the inner-layer index node, and enable the outer-layer index node to point to the file data of the source file again. For example, the consistency exception may include but is not limited to at least one of the following: an I/O reading or writing error and insufficient memory space. For example, the consistency management module may detect whether an I/O reading or writing error occurs by analyzing a log. For a specific detection manner, refer to an embodiment in a conventional technology. Details are not described in this application. In an embodiment of this application, the dual-layer management module processes the index node of the source file or the index node and the file data only after the inner-layer index node is established. This can ensure a proper rollback of the dual-layer management module when a consistency exception occurs.

S803: The deduplication module deduplicates the duplicate files.

For example, after creating the inner-layer index node, the dual-layer node management module sends indication information to the deduplication module, to indicate that the inner-layer index node is created. In response to the indication from the dual-layer node management module, the deduplication module continues to perform subsequent deduplication.

In an example, the dual-layer node management module creates the inner-layer index node in the first manner described above, that is, in a manner of copying the file data. For example, the deduplication module associates the index node of the source file with the inner-layer index node. Then, the deduplication module deletes the index information and the file data from the index node of the source file. In an embodiment of this application, deleting the index information in the index node may also be understood as nulling (or setting to 0), that is, clearing all indexes included in the index information but reserving space occupied by the indexes.

In another example, the dual-layer node management module creates the inner-layer index node in the second manner described above, that is, in a manner in which the index in the index node is associated with the file data of the source file. The deduplication module may clear all index information in the index node of the source file after associating the index node of the source file with the inner-layer index node. In an embodiment of this application, when processing the file data, the deduplication module first associates the outer-layer index with the inner-layer index, and then deletes the file data, to improve data processing security and avoid a problem of a rollback failure that occurs after the data is deleted.

In an embodiment of this application, a manner in which the deduplication module associates index nodes of the file (including the index node of the source file and an index node of the target file described in the following) with the inner-layer index node may include but is not limited to:

(1) The deduplication module may maintain an index relationship table (or may be in another form, which is not limited in this application). An association relationship between the index node and the inner-layer index node is recorded in the index relationship table. For example, the association relationship is shown in Table 1.

TABLE 1

| Inner-layer index node 1 | Index node 1 |
| | Index node 2 |
| | Index node 3 |
| Inner-layer index node 2 | Index node 4 |
| | Index node 5 |

As shown in Table 1, the index node 1 to the index node 3 correspond to the inner-layer index node 1. In other words, the index node 1 to the index node 3 are all associated with the inner-layer index node 1. The index node 4 and the index node 5 are associated with the inner-layer index node 2.

A correspondence shown in Table 1 is merely an example, and is not limited in this application.

In an embodiment of this application, each index node (including an inner-layer index node and an outer-layer index node (namely, the index node 1 to the index node 5)) in Table 1 is optionally identification information of the index node. In an example, the identification information may be an identity document (ID) number of the index node. In another example, the identification information may be a storage address of the index node. It should be noted that, in an embodiment of this application, the identification information is used to uniquely identify the index node. If an address of the index node is changed, the identification information (namely, the address) of the index node recorded in Table 1 is correspondingly updated, to always maintain a correct correspondence.

(2) The deduplication management module may add identification information of the inner-layer index node to the outer-layer index node (for example, the index node of the source file and the index node of the target file described in the following), to indicate that the outer-layer index node is associated with the inner-layer index node corresponding to the identification information of the inner-layer index node. In an example, the identification information of the inner-layer index node may be an ID number of the inner-layer index node. In another example, the identification information of the inner-layer index node may be an address of the inner-layer index node. This is not limited in this application.

For example, after converting the single-layer index node structure of the source file into the dual-layer index node structure, the deduplication module may continue to convert the index node of the target file, to deduplicate the target file. In an embodiment of this application, the target file is a file other than the source file in a same similar file group. The target file may also be referred to as a to-be-deduplicated file or a duplicate file, for example, the picture 5092b, the picture 5093a, or the picture 5093c in FIG. 5a (1) to FIG. 5a (4).

For example, the deduplication module associates the index node of the target file with an inner-layer index node corresponding to a similar file group to which the target file belongs. Then, the deduplication module may delete a data block that is in the target file and that is the same as that in the source file, to complete deduplication on the target file. This reduces space occupied by duplicate data of the target file.

It should be noted that, as described above, the duplicate files may include same files and similar files, namely, files whose data blocks are completely the same and files whose data is partially the same. In an embodiment of this application, if data blocks (namely, file data) of the target file are completely the same as those of the source file, the deduplication module may delete all file data, namely, the data blocks, corresponding to the target file. If data blocks of the target file are partially the same as those of the source file, the deduplication module deletes same data blocks, and reserves different data blocks (referred to as reserved data blocks). In addition to being associated with the inner-layer index node, the index node of the target file further reserves index information pointing to the reserved data block.

It should be further noted that, in a process of performing S803, the consistency management module also performs consistency check. For example, if the consistency management module detects that a consistency exception occurs in the process of performing S803, the consistency management module sends indication information to the deduplication module to indicate that the consistency exception occurs. The deduplication module may perform a deduplication rollback based on the indication from the consistency management module. In other words, the deduplication module restores the target file to a status obtained before S803. In other words, the index node of the target file points to the file data of the target file. A specific example is used for description below.

It should be noted that, as described above, the scanning service may scan a plurality of similar file groups, and the file system may perform the data processing procedure from S801 to S803 for each similar file group. For example, the file system may process the plurality of similar file groups in sequence, or may process the plurality of similar file groups in parallel. This is not limited in this application.

It should be further noted that there may be one or more target files. In other words, a similar file group may include two or more similar files. After establishing the dual-layer index node, the file system may process each target file in sequence, or may process a plurality of target files at the same time. This is not limited in this application.

In a possible implementation, the file modification monitoring module monitors a modification of the target file before S803 is performed. If the file modification module detects that the target file is modified, the file modification module sends modification indication information to the scanning service. The scanning service may rescan the target file to check whether a modified target file is similar to the source file. If the modified target file is not similar to the source file, the procedure ends. If the modified target file and the source file are similar files, continue to perform S803.

Figure 9A:
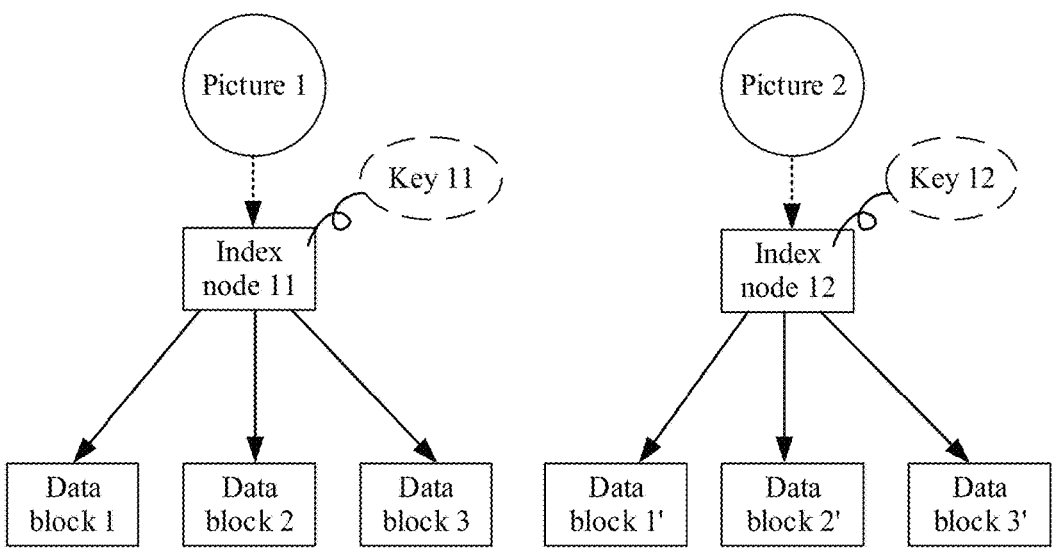
FIG. 9*a* is a diagram of an example of similar files.

The following describes the procedure in FIG. 8 in detail with reference to a specific embodiment. FIG. 9a is a diagram of an example of similar files. With reference to FIG. 9a, for example, in response to an indication from a mobile phone manager application, a scanning service scans files in a memory, and detects a plurality of similar file groups. For specific descriptions, refer to FIG. 5a (1) to FIG. 5a (4). Details are not described herein again. In this example, the scanning service detects that a picture 1 and a picture 2 are duplicate files. In other words, the picture 1 and the picture 2 are in a same similar file group. In this example, data of the picture 1 is completely the same as that of the picture 2. To be specific, data in a data block 1, a data block 2, and a data block 3 to which an index node 11 of the picture 1 points is respectively the same as data in a data block 1', a data block 2', and a data block 3' to which an index node 12 of the picture 2 points. It should be noted that, in this example, only two files (namely, pictures) whose data is the same are used as an example for description, and a deduplication manner of similar files (that is, data is partially the same) is described by using a specific example in the following embodiment.

Optionally, the index node 11 corresponds to a key, namely, a key 11. The index node 12 corresponds to a key, namely, a key 12. The key 11 is the same as or different from the key 12. For example, the key 11 may be generated by a file system based on a directory (for a concept, refer to the foregoing descriptions) of the picture 1, and the key 12 may be generated by the file system based on a directory of the picture 2. For a specific generation manner, refer to an embodiment in a conventional technology. Details are not described in this application.

Optionally, an ID number of the index node 11 is ID11, and an ID number corresponding to the index node 12 is ID12. An ID of each node is generated when the index node is created.

For example, a key of the index node may be used to encrypt or decrypt a data block to which the index node points. For example, data in the data block 1 is generated through encryption based on the key, namely, the key 11, corresponding to the index node 11. Correspondingly, if the file system needs to read the data in the data block 1, the data block 1 needs to be decrypted by using the key (namely, the key 11) of the index node 11, to obtain the corresponding data. It should be noted that, for a manner in which an index node points to a data block, refer to the descriptions of FIG. 4. In other words, each index node may include but is not limited to size information, index information, and the like. Each piece of index information may include a plurality of indexes, and each index points to a corresponding data block. The index may directly point to the data block, or may indirectly point to the data block. This is not limited in this application.

Figure 9B:
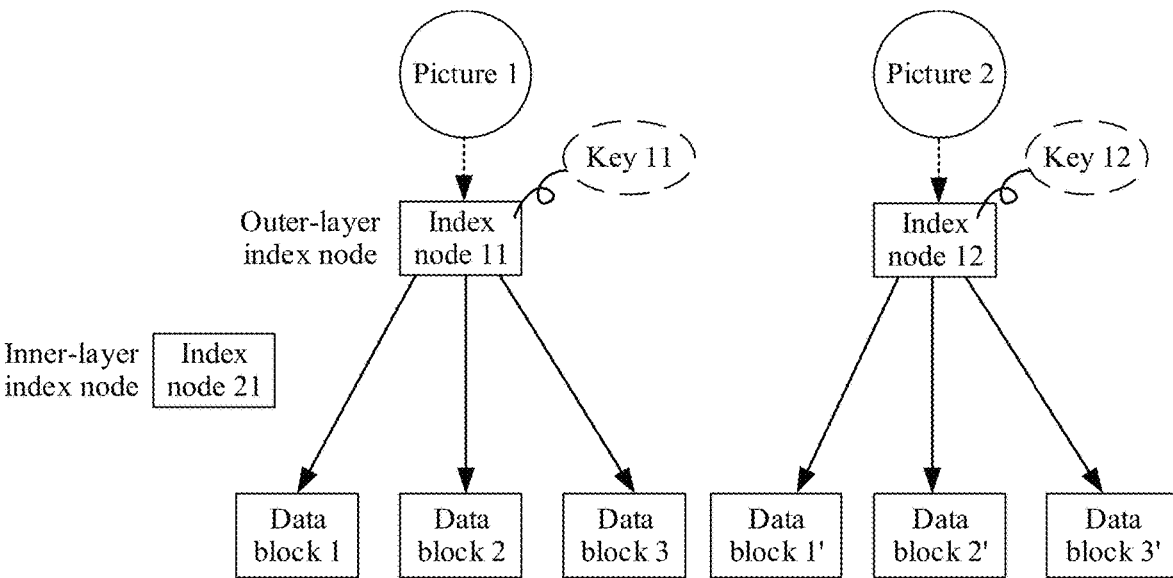
FIG. 9*b* to FIG. 9*f* are diagrams of an example of creating a dual-layer index node.

FIG. 9b to FIG. 9f are diagrams of an example of creating a dual-layer index node. With reference to FIG. 9b, a dual-layer node management module detects whether an inner-layer index node exists in the group to which the picture 1 and the picture 2 belong. In this example, the dual-layer node management module does not detect the inner-layer index node, and the dual-layer node management module selects the picture 1 as a source file, and creates the inner-layer index node, namely, an index node 21. Certainly, in another embodiment, as described above, the source file may alternatively be another picture or selected by a user. This is not limited in this application.

For example, the index node 21 corresponds to an ID number, for example, an ID 21. Optionally, an index node may include information such as index information, and information such as index information in the current index node 21 is null.

Figure 9C:
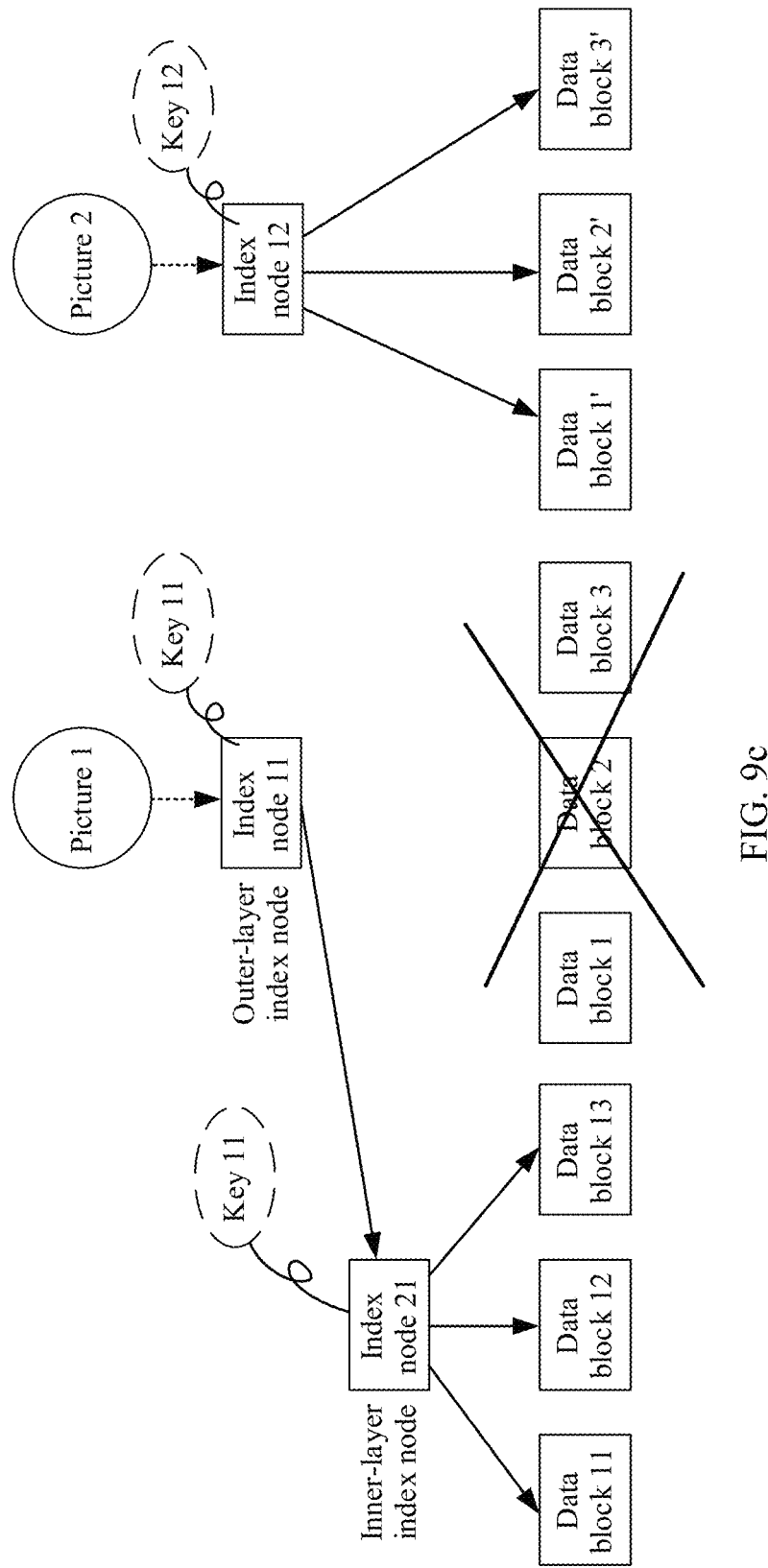

With reference to FIG. 9c, for example, the dual-layer node management module copies at least one piece of information (including information such as size information and the key) other than index information in the index node 11 to the index node 21. With reference to FIG. 9c, for example, the dual-layer node management module copies all the data (including the data block 1, the data block 2, and the data block 3) of the picture 1 (namely, the source file), that is, generates a data block 11, a data block 12, and a data block 13. In addition, the dual-layer node management module configures the index node 21 (namely, the inner-layer index node) to point to the data block 11, the data block 12, and the data block 13. Optionally, data in the data block 11, the data block 12, and the data block 13 is generated by using the key 11.

Figure 9D:
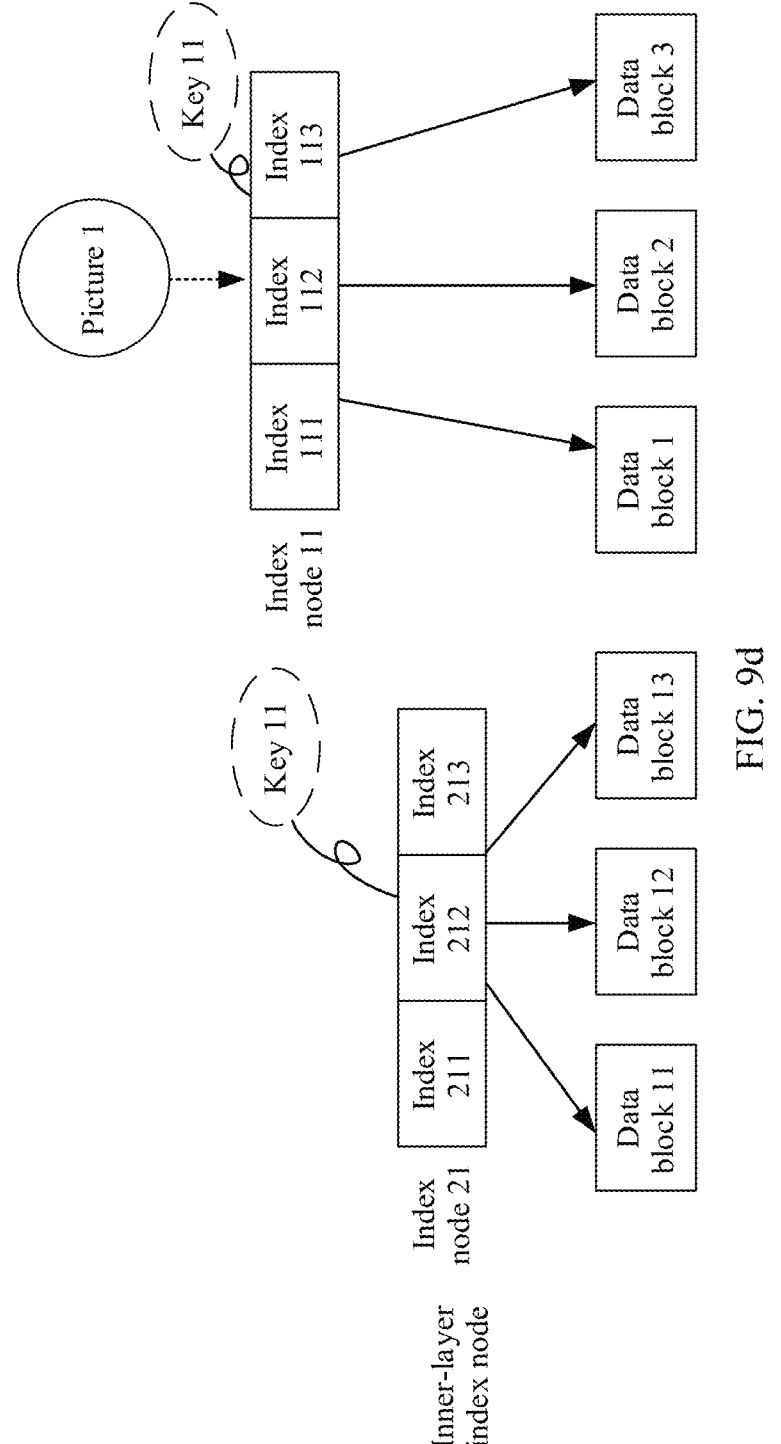

FIG. 9d is a diagram of an example of a structure of an index node. With reference to FIG. 9d, the index information in the index node 21 includes but is not limited to an index 211, an index 212, and an index 213. It should be noted that FIG. 9d shows only the index information, and the index node 21 (and another node in the following) further includes other information such as an ID number and size information. This is not described in the following.

Still with reference to FIG. 9d, for example, the index 211 points to the data block 11 (in a direct or indirect manner, where this is not described again in the following), the index

212 points to the data block 12, and the index 213 points to the data block 13. In addition, the index information in the index node 11 of the picture 1 includes but is not limited to an index 111, an index 112, and an index 113. The index 111 points to the data block 1, the index 112 points to the data block 2, and the index 113 points to the data block 3.

Still with reference to FIG. 9*c*, after creating the inner-layer index node, the dual-layer node management module notifies a deduplication module to continue processing. The deduplication module associates the index node 11 with the index node 21. A specific association manner may be any one of the foregoing Manner (1) and Manner (2) in an embodiment of this application. This is not limited in this application.

Figure 9E:
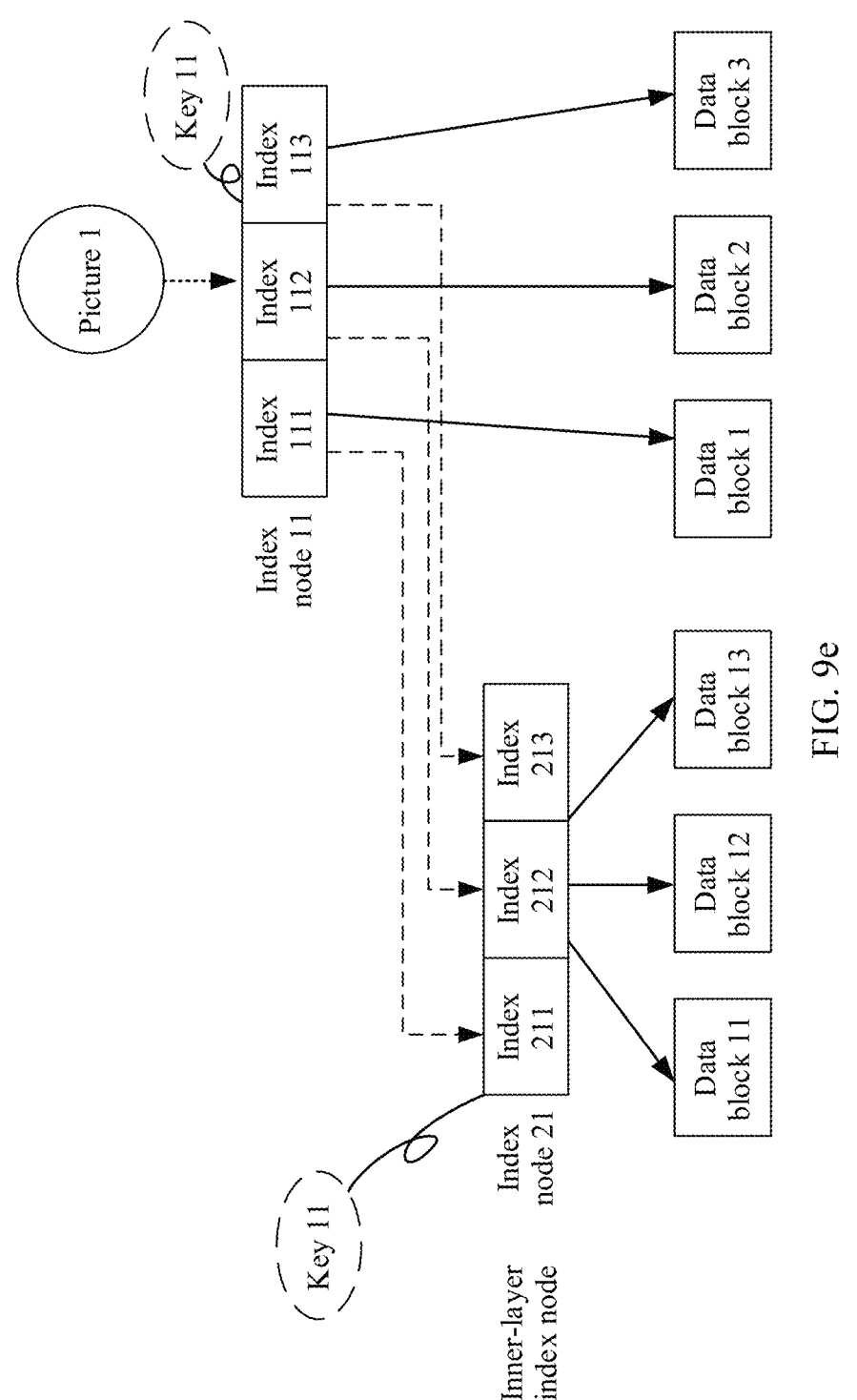

FIG. 9*e* is a diagram of an example of a structure of an index node. With reference to FIG. 9*e*, the index node 11 is associated with the index node 21. However, in an actual reading or writing process, the file system may find a corresponding index in the index node 21 based on an offset algorithm of the index node 11. It may be understood that the index 111 corresponds to the index 211, the index 112 corresponds to the index 212, and the index 113 corresponds to the index 213. However, there is no actual pointing relationship between the foregoing indexes. In a reading process, a corresponding index in the index node 21 may be found by using a specific algorithm (refer to a description in an embodiment in a conventional technology, which is not described herein), and a corresponding data block is found based on the index. It may be understood that a dashed arrow in an embodiment of this application indicates a correspondence. In other words, an index does not directly point to data, but an index corresponding to the inner-layer index node may be obtained based on an algorithm. A solid arrow indicates a pointing relationship. In other words, an index has a specific value, and directly or indirectly points to a corresponding data block.

In an embodiment of this application, the index node 11 is associated with the inner-layer index node (namely, the index node 21), and the index node 11 may be referred to as an outer-layer index node.

Still with reference to FIG. 9*c*, the deduplication module deletes file data of the picture 1 (namely, the source file), namely, the data block 1, the data block 2, and the data block 3, to save storage space.

Figure 9F:
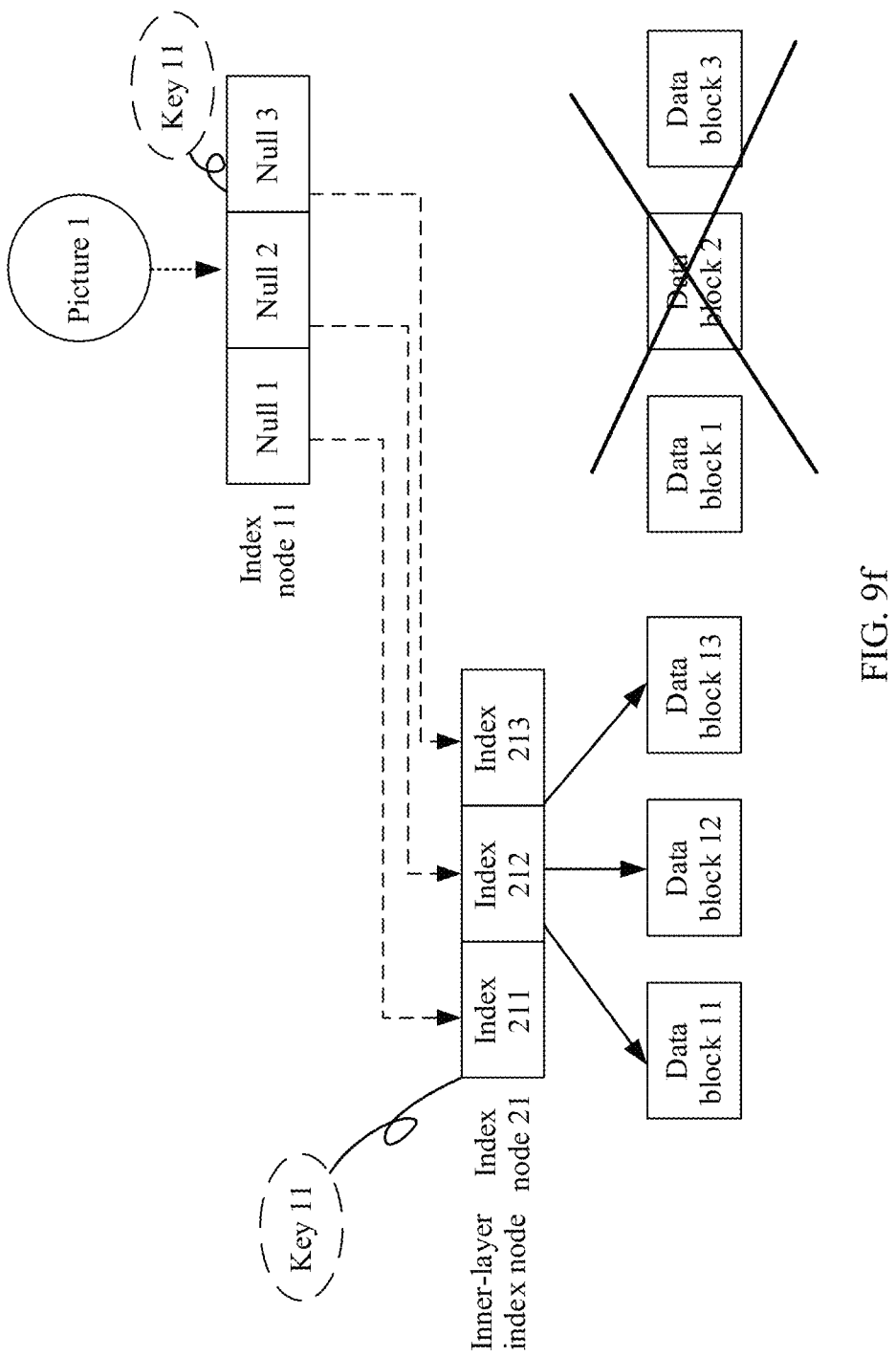

FIG. 9*f* is a diagram of an example of a structure of an index node. With reference to FIG. 9*f*, for example, the deduplication module deletes the data block 1, the data block 2, and the data block 3. In addition, the deduplication module clears indexes corresponding to the data block 1, the data block 2, and the data block 3 in the index node 11, that is, clears the original index 111, the original index 112, and the original index 113. This may also be understood as nulling (or setting to 0). As described above, after the indexes in the index node 11 are cleared, space (namely, a location) of each index is still reserved. To better describe a reference relationship, a location obtained after the index 111 is cleared is represented as null 1, a location obtained after the index 112 is cleared is represented as null 2, and a location obtained after the index 113 is cleared is represented as null 3. As described above, in a use process, the file system may determine, based on a specific algorithm, an index that corresponds to a null index in the index node 11 and that is in the index node 21. For example, the null 1 corresponds to the index 211, the null 2 corresponds to the index 212, and the null 3 corresponds to the index 213.

Figure 10A:
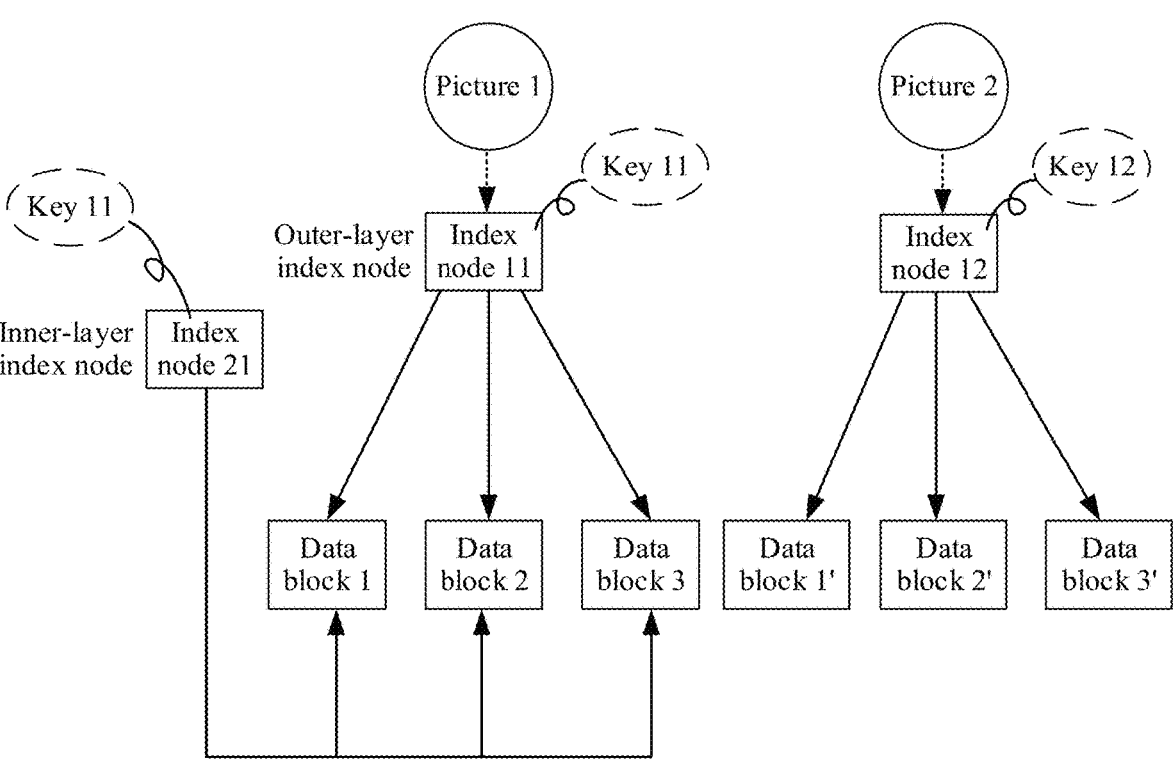
FIG. 10*a* and FIG. 10*b* are diagrams of an example of creating another dual-layer index node.
Figure 10B:
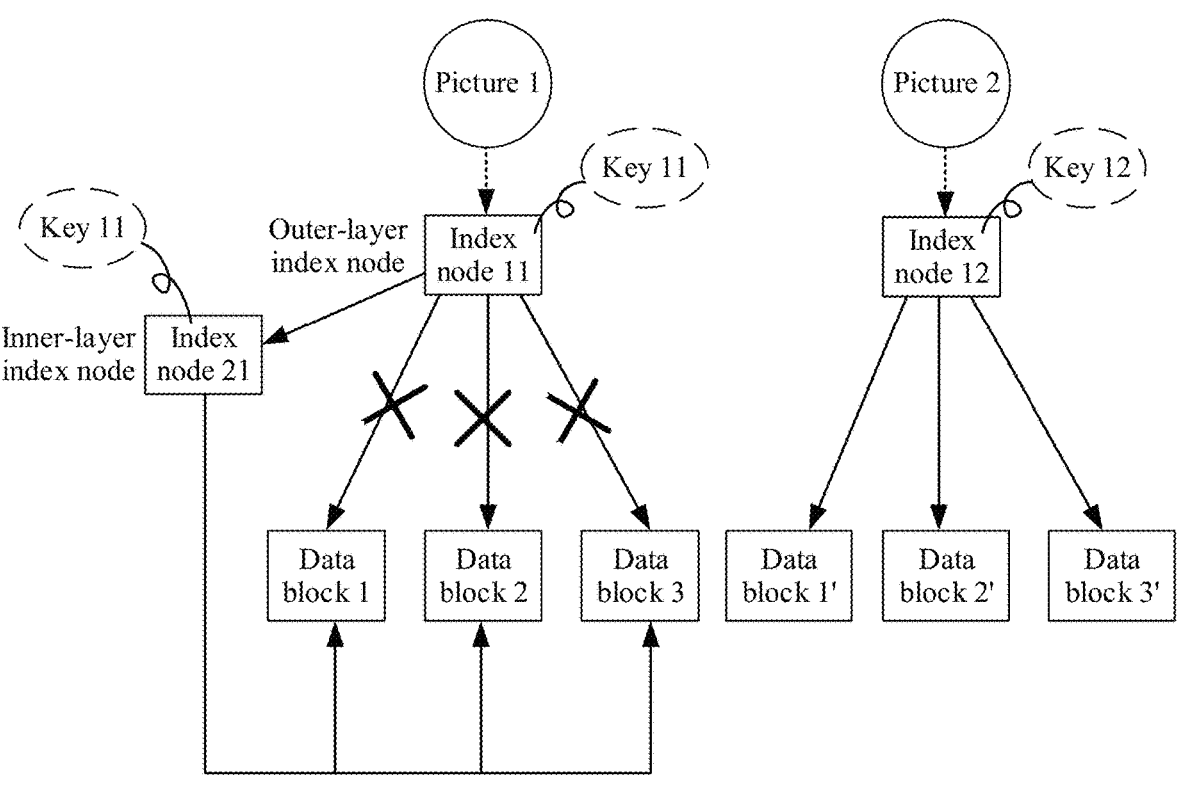

FIG. 10*a* and FIG. 10*b* are diagrams of an example of creating another dual-layer index node. With reference to FIG. 10*a*, a dual-layer node management module creates the inner-layer index node (an index node 21). An ID number corresponding to the index node 21 is ID21. For other descriptions, refer to the foregoing descriptions. Details are not described herein again.

For example, the dual-layer node management module copies all information (including size information, a key, index information, and the like) of an index node 11 to the index node 21. In other words, indexes (for example, an index 211, an index 212, and an index 213) in the index node 21 point to a data block 1, a data block 2, and a data block 3.

With reference to FIG. 10*b*, after configuring the index node 11 to point to the index node 21, a deduplication module clears an index in the index node 11. In other words, as shown in FIG. 9*f*, the index node sets the index in the index 11 to null.

In an embodiment of this application, as described above, in a process of creating the dual-layer index node, if a consistency management module detects that a consistency exception occurs, the consistency management module indicates the dual-layer node management module to perform a dual-layer index node rollback. In other words, when performing any step in FIG. 9*b* to FIG. 9*c* or FIG. 10*a* and FIG. 10*b*, in response to an indication from the consistency management module, the dual-layer node management module or the deduplication module restores the node and data to a status in FIG. 9*a*.

Figure 11A:
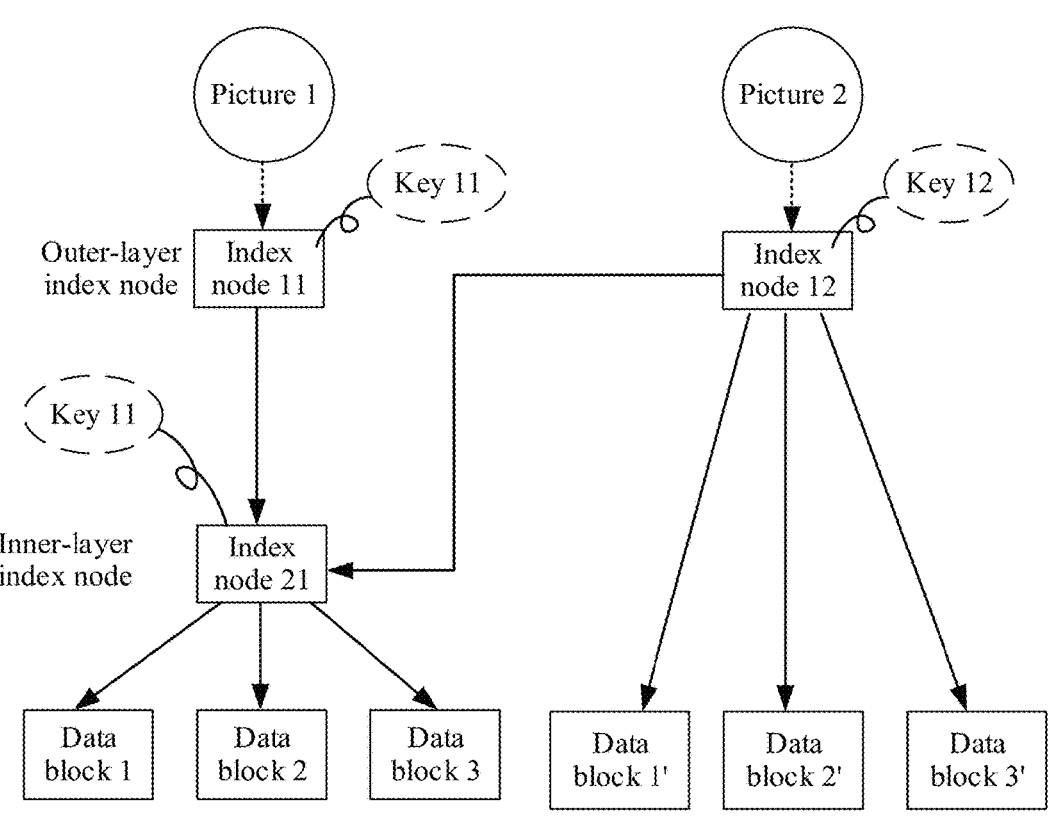
FIG. 11*a* is a diagram of an example of a deduplication procedure.

FIG. 11*a* is a diagram of an example of a deduplication procedure. With reference to FIG. 11*a*, for example, after a dual-layer node management module completes creating a dual-layer index node, a deduplication management module associates the index node (namely, an index 12) of a target file (for example, a picture 2) with an index node 21. For a specific association manner, refer to the foregoing Manner (1) or Manner (2). Details are not described herein again.

Figure 11B:
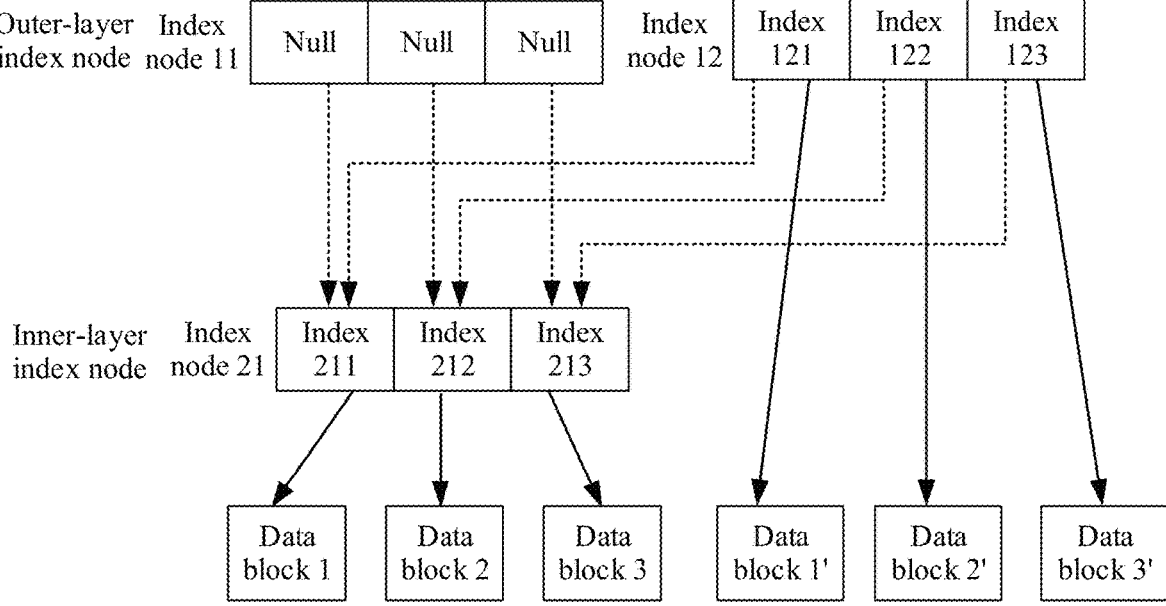
FIG. 11*b* is a diagram of an example of a structure of an index node.

FIG. 11*b* is a diagram of an example of a structure of an index node. With reference to FIG. 11*b*, for example, the deduplication management module associates the index node 12 with the index node 21. This is similar to a process of associating an index node 11 with the index node 21. Actually, the index node 12 is associated with the index node 21 as a whole. A dashed line in FIG. 11*b* indicates a correspondence between indexes. For example, an index 121 corresponds to an index 211, an index 122 corresponds to an index 212, and an index 123 corresponds to an index 213. In other words, a file system may search for a corresponding index in the index node 211 based on a specific algorithm, and find corresponding data. The index 121, the index 122, and the index 123 currently still respectively point to a data block 1', a data block 2', and a data block 3'. For specific descriptions, refer to FIG. 9*e*. Details are not described herein again.

Figure 11C:
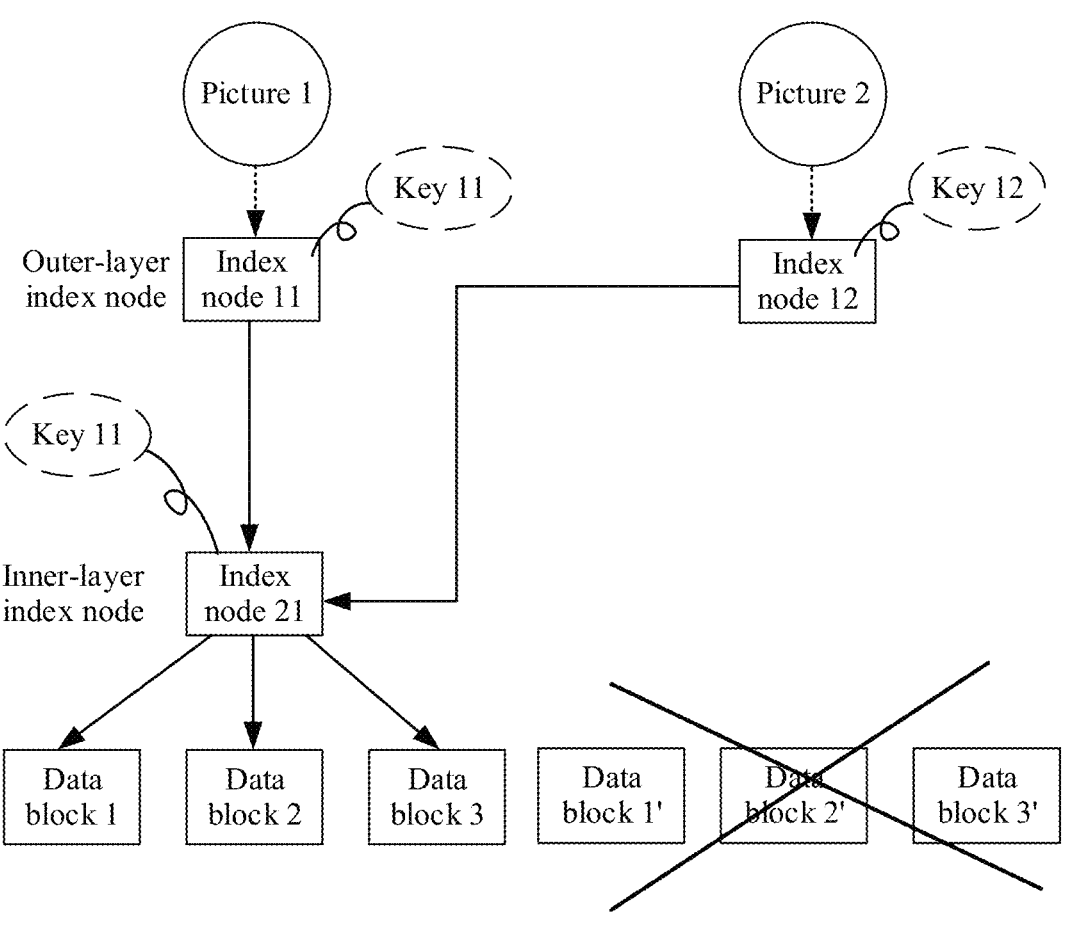
FIG. 11*c* is a diagram of an example of a deduplication procedure.

FIG. 11*c* is a diagram of an example of a deduplication procedure. With reference to FIG. 11*c*, for example, the deduplication module deletes file data (including the data block 1', the data block 2', and the data block 3') of the target file (namely, the picture 2), and clears index information in the index node 12.

Figure 11D:
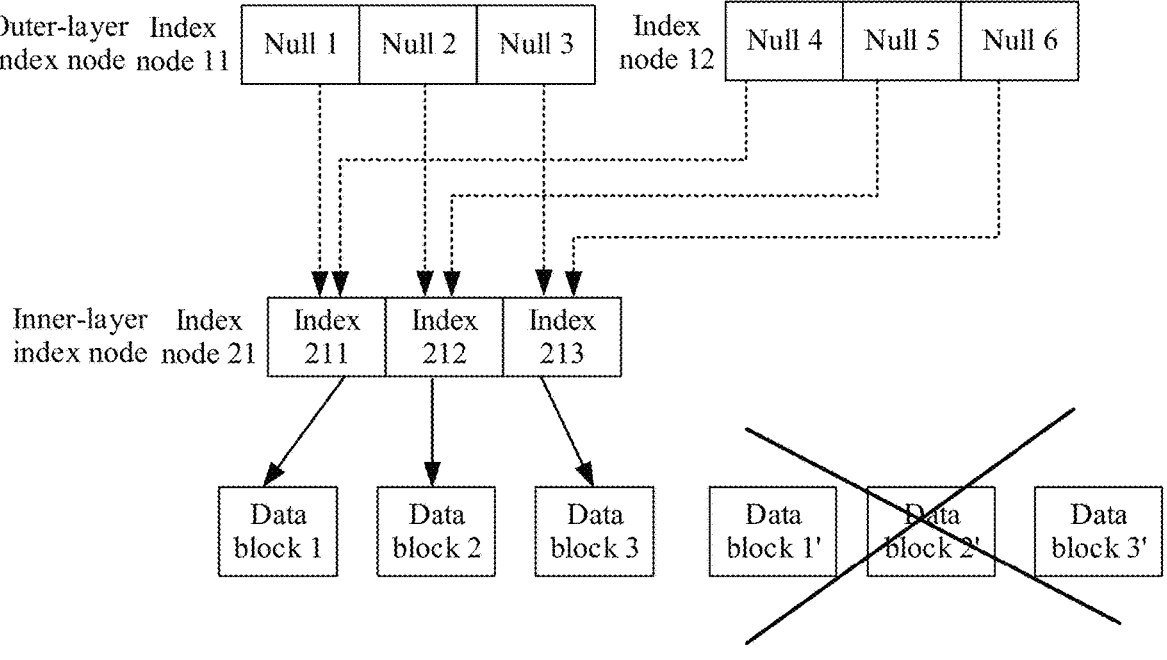
FIG. 11*d* is a diagram of an example of a structure of an index node.

For example, FIG. 11*d* is a diagram of an example of a structure of an index node. With reference to FIG. 11*d*, the deduplication module deletes the data block 1', the data block 2', and the data block 3', and sets the index 121, the index 122, and the index 123 in the index node 12 to null.

For example, as described above, the file system may obtain a correspondence between a null index in the index node 12 and an index in the index node 21 based on a specific algorithm. For example, a null 4 corresponds to the index 211, a null 5 corresponds to the index 212, and a null 6 corresponds to the index 213.

Figure 12A:
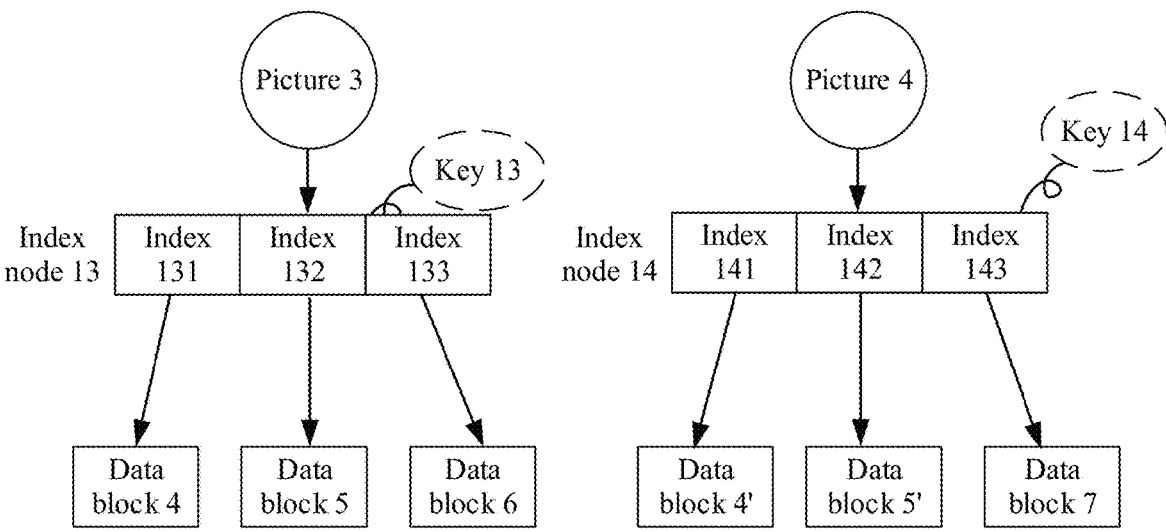
FIG. 12*a* is a diagram of an example of similar files in a similar file group.

The following describes in detail a deduplication procedure of similar files (that is, file data is partially the same) with reference to the accompanying drawings. FIG. 12a is a diagram of an example of similar files in a similar file group, including a picture 3 and a picture 4. For a scanning process, refer to related content in the foregoing embodiments. Details are not described herein again. An index node 13 of the picture 3 includes but is not limited to an index 131, an index 132, and an index 133. The index 131 points to a data block 4, the index 132 points to a data block 5, and the index 133 points to a data block 6. In addition, a key of the index node 13 is a key 13. In other words, the data block 4 to the data block 6 are generated through encryption based on the key 13. An ID corresponding to the index node 13 is ID13.

For example, an index node 14 of the picture 4 includes but is not limited to an index 141, an index 142, and an index 143. The index 141 points to a data block 4', the index 142 points to a data block 5', and the index 143 points to a data block 7. Data in the data block 4 is the same as data in the data block 4', data in the data block 5 is the same as data in the data block 5', and data in the data block 7 is different from data in the data block 6.

For example, a key of the index node 14 is a key 14. In other words, the data block 4', the data block 5', and the data block 7 are generated through encryption based on the key 14. An ID number of the index node 14 is ID14.

Figure 12B:
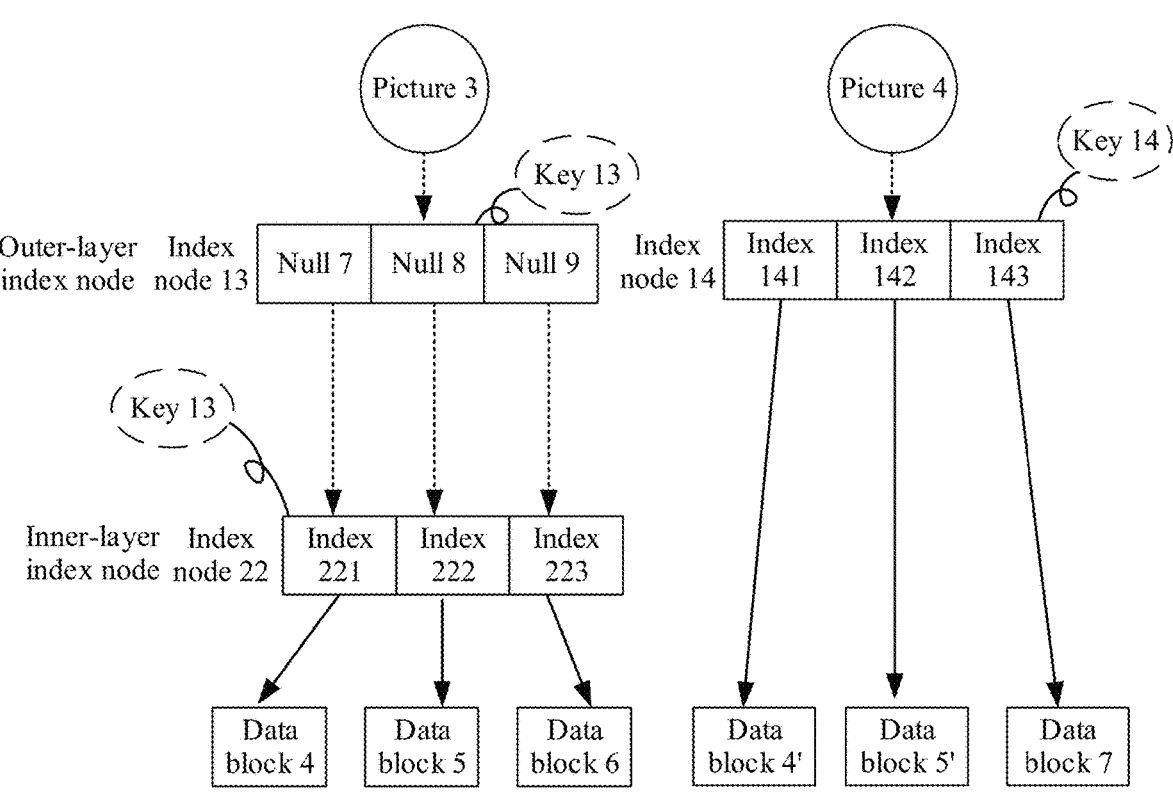
FIG. 12*b* is a diagram of an example of a structure of a dual-layer node.

FIG. 12b is a diagram of an example of a structure of a dual-layer node. With reference to FIG. 12b, for example, a dual-layer management module selects the picture 3 as a source file, and creates an inner-layer index node, namely, an index node 22. An ID number of the index node 22 is ID22, and a deduplication module associates the index node 13 of the picture 3 with the index node 22. For a specific association manner, refer to the foregoing Manner (1) or Manner (2). Details are not described herein again.

For example, the index node 22 includes but is not limited to an index 211, an index 222, and an index 223. The index 221 points to a data block 4, the index 222 points to the data block 5, and the index 223 points to the data block 6. For a specific process of creating the inner-layer index node, refer to related content in the foregoing embodiments. Details are not described herein again.

Figure 12C:
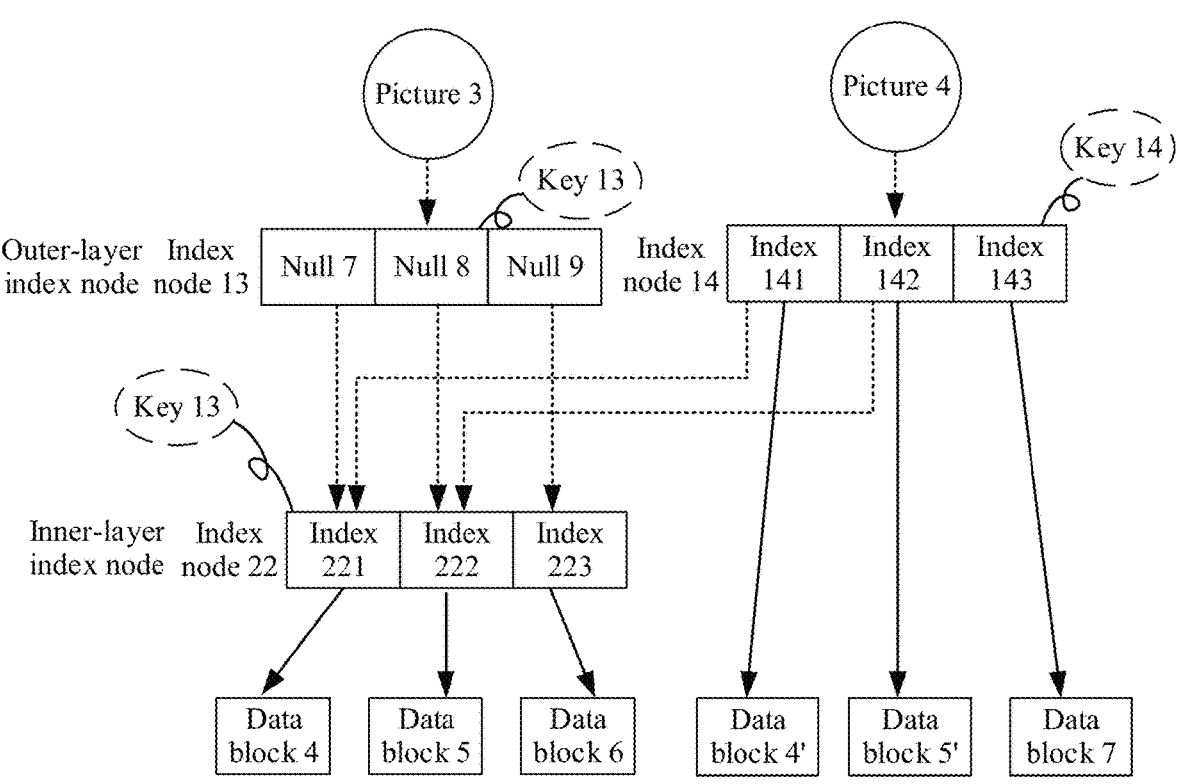
FIG. 12*c* is a diagram of an example of a deduplication procedure.

FIG. 12c is a diagram of an example of a deduplication procedure. With reference to FIG. 12c, the deduplication module associates the index node 14 with the index node 22. For a specific association manner, refer to the foregoing Manner (1) or Manner (2). Details are not described herein again. For example, the index 141 corresponds to the index 221, and the index 142 corresponds to the index 222. For a description of the correspondence, refer to the foregoing description. Details are not described herein again. For example, indexes in the index node 14 currently still maintain previous pointing relationships.

Figure 12D:
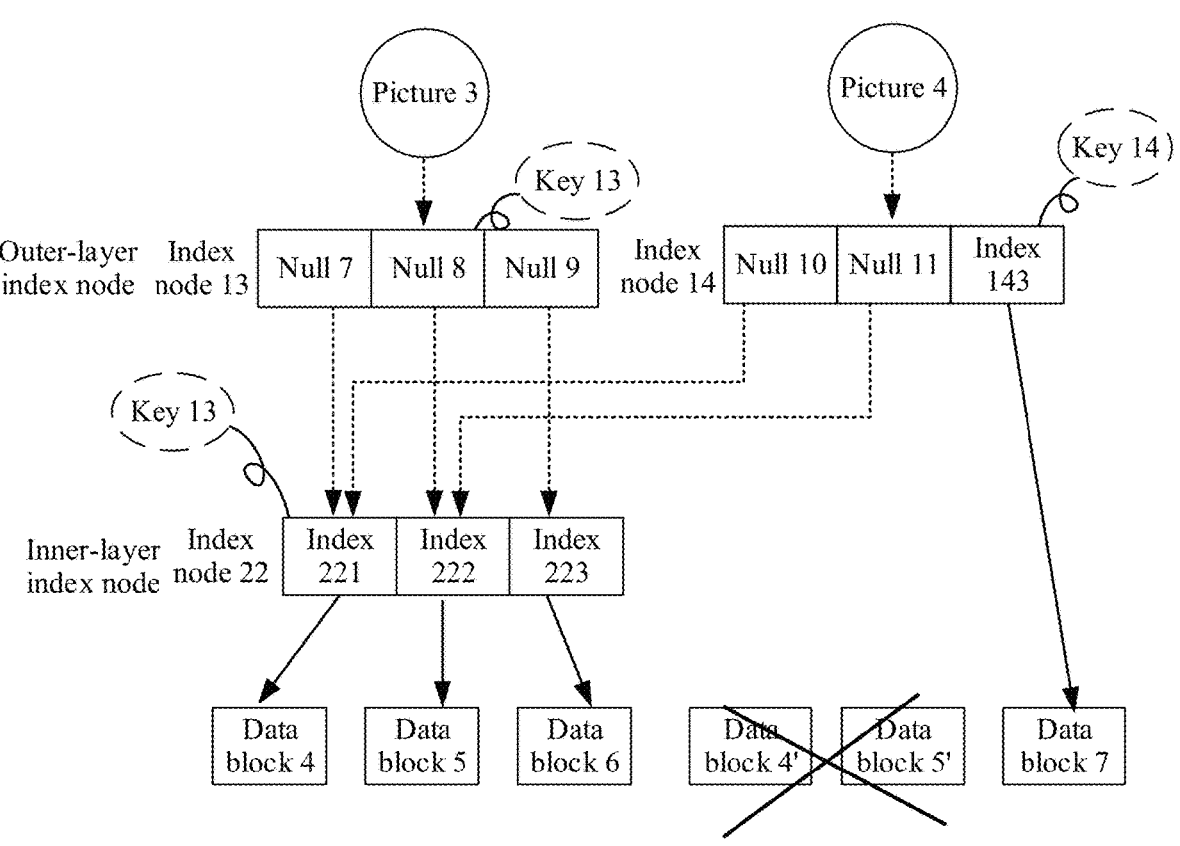
FIG. 12*d* is a diagram of an example of a deduplication procedure.

FIG. 12d is a diagram of an example of a deduplication procedure. With reference to FIG. 12d, the deduplication module deletes a part that is in file data of the picture 4 and that is the same as that of the picture 3, namely, the data block 4' and the data block 5'. In addition, the deduplication module sets the original index 141 and the index 142 in the index node 14 to null, namely, null 10 and null 11 shown in FIG. 12d. In this example, the file system may obtain, based on a specific algorithm, that the null 10 corresponds to the index 221, and the null 11 corresponds to the index 222.

Still with reference to FIG. 12d, for example, for a part that is in the file data of the picture 4 and that is different from that of the picture 3, namely, the data block 7, the index node 14 still maintains an original pointing relationship. In other words, the index 143 points to the data block 7.

In this way, in an embodiment of this application, the inner-layer index node is introduced, and a correspondence with an outer-layer index node is established by using an ID number, an address, or the like. In other words, the outer-layer index node points to the inner-layer index node, so that processing of a deduplicated file is imperceptible for an upper-layer application. In other words, the upper-layer application can read or write data according to the original procedure, and the file data may find corresponding data or an index based on the correspondence between the outer-layer index node and the inner-layer index node, and read or write the data. For the upper-layer application, a type of the outer-layer index node is the same as an original type. It may be understood that, in an embodiment of this application, different from that in a soft connection manner in the conventional technology described above, in this application, the outer-layer index node is associated with the inner-layer index node by using the ID number or the address, and no information about the outer-layer index node needs to be changed. For the application, the index corresponding to the data block still exists, instead of being changed to a soft link or a hard link type in the conventional technology.

Figure 13A:
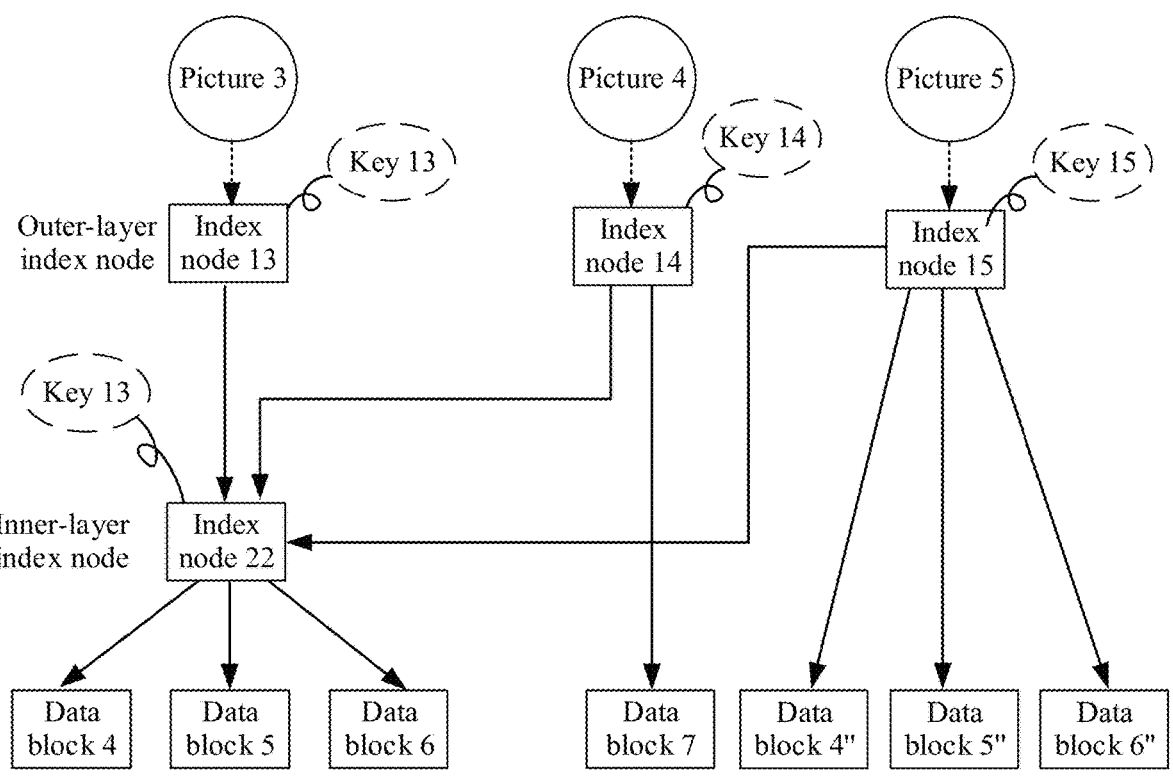
FIG. 13*a* and FIG. 13*b* are diagrams of an example of a deduplication procedure.
Figure 13B:
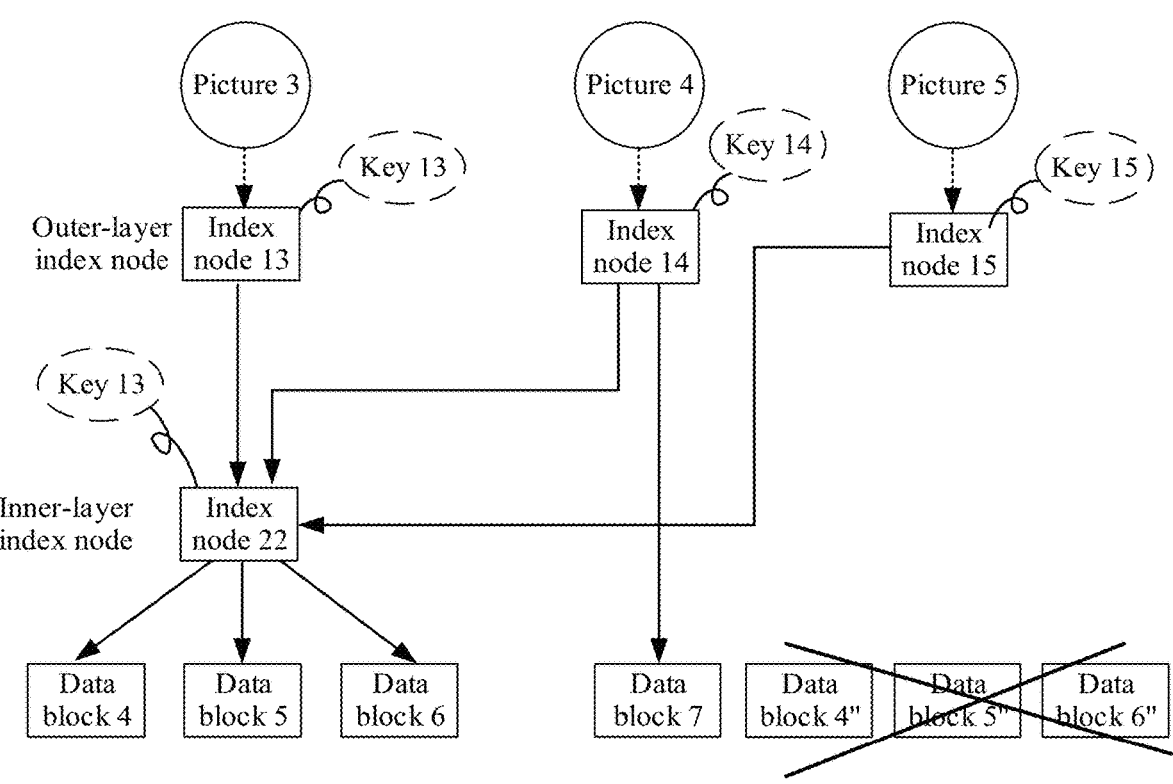

FIG. 13a and FIG. 13b are diagrams of an example of a deduplication procedure. With reference to FIG. 13a, for example, a similar file group may further include more target files, for example, may further include a picture 5. It should be noted that the picture 5 may be determined during same scanning as a picture 3, or the picture 5 may be detected during next scanning. For example, after a mobile phone performs the procedure in FIG. 12a and FIG. 12b, during next scanning, if it is detected that the picture 5 and a source file (namely, the picture 3) are same or similar pictures, the picture 5 and the picture 3 are in a similar file group.

Still with reference to FIG. 13a, for example, an index node 15 of the picture 5 points to a data block 4", a data block 5", and a data block 6". Data in the data block 4" is the same as data in a data block 4, data in the data block 5" is the same as data in a data block 5, and data in the data block 6" is the same as data in a data block 6. Certainly, the picture 5 and the picture 3 may alternatively be similar files (that is, data is partially the same), and a processing manner of the picture 5 is similar to that of a picture 4. Details are not described herein again. For example, a key of the index node 15 is a key 15, and an ID number of the index node 15 is ID15.

With reference to FIG. 13a, a dual-layer node management module detects that the picture 5 belongs to a group to which the picture 3 (namely, the source file) belongs, and an inner-layer index node (namely, an index node 22) is created in the group. The dual-layer node management module indicates a deduplication module to perform the deduplication procedure. The deduplication module associates the index node 15 with the index node 22. For a specific association manner, refer to the foregoing Manner (1) or Manner (2). Details are not described herein again. For example, as shown in FIG. 13a, before data of the picture 5 is deleted, the index node 15 still points to the data block 4", the data block 5", and the data block 6". For a specific pointing manner, refer to the foregoing descriptions. Details are not described herein again.

With reference to FIG. 13b, the deduplication module deletes the data block 4", the data block 5", and the data block 6", and clears index information in the index node 15. For specific details, refer to related content in the foregoing embodiments. Details are not described herein again.

For example, index nodes (including an index node 14 and the index node 15) of the picture 4 and the picture 5, namely, pictures that are the same as or similar to the picture 3, in the similar file group, are both associated with the inner-layer index node, namely, the index node 22.

In a possible implementation, in an embodiment of this application, the deduplication module may add identification information of a deduplicated file to each outer-layer index node (for example, an index node 11, an index node 12, an index node 13, or the index node 14) associated with the inner-layer index node (which may be a same inner-layer index node or may be different inner-layer index nodes), to indicate that a file corresponding to the index node is the deduplicated file, which may also be understood as indicating that the index node is associated with the inner-layer index node. Correspondingly, in a reading or writing process, a file system may determine, based on the identification information of the deduplicated file, that the file corresponding to the index node is the deduplicated file, and the index node is associated with the inner-layer index node.

In another possible implementation, if a manner of associating the outer-layer index node with the inner-layer index node is the foregoing Manner (2), that is, the outer-layer index node includes identification information of the inner-layer index node, a file system may determine, based on the identification information, that the index node is an outer-layer index node, that is, the index node is associated with the inner-layer index node, and a corresponding file is a deduplicated file.

Figure 14:
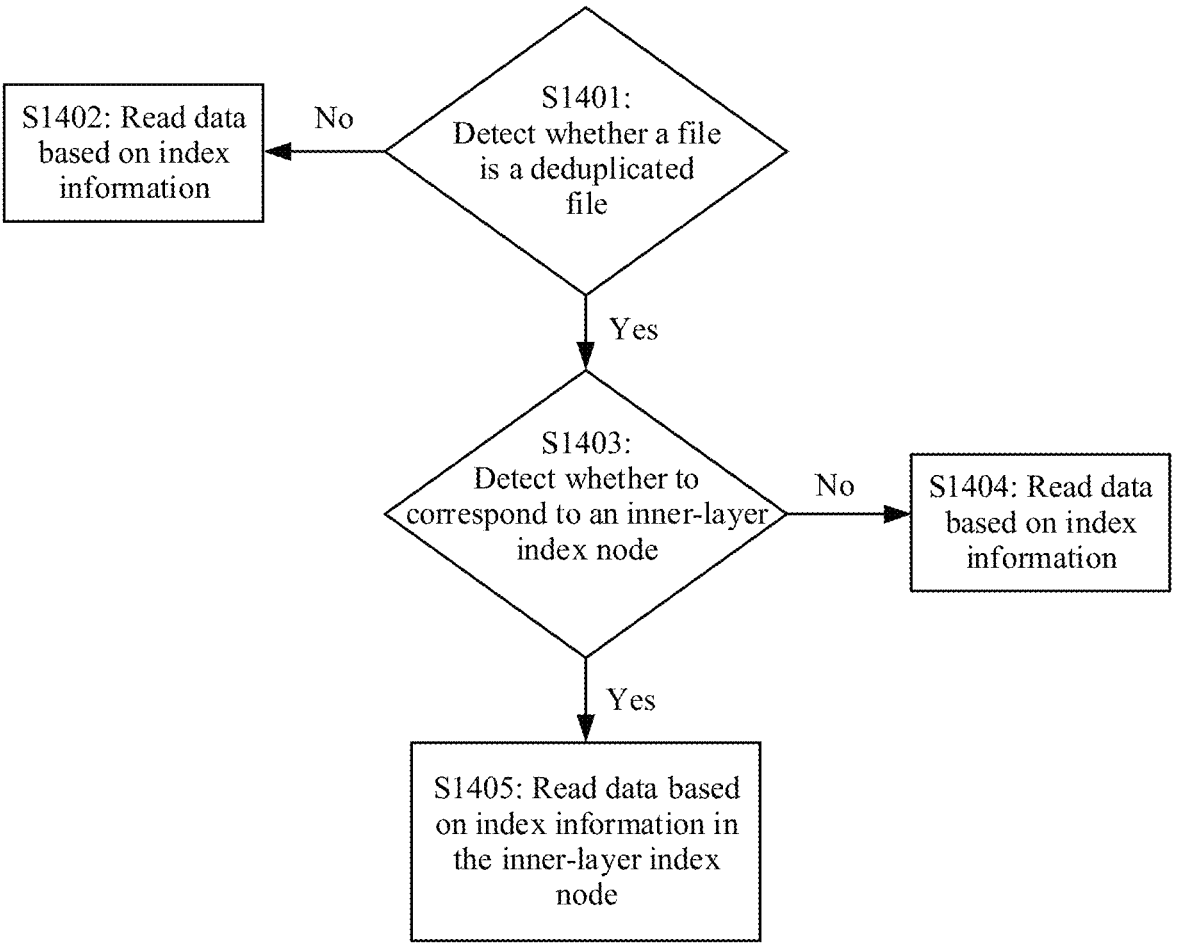
FIG. 14 is a diagram of an example of a data reading procedure.

FIG. 14 is a diagram of an example of a data reading procedure. With reference to FIG. 14, the procedure specifically includes but is not limited to the following steps.

S1401: Detect whether a file is a deduplicated file.

In this example, the file in FIG. 12d is used as an example to describe the reading procedure. For example, in response to an indication (for an indication manner, refer to a conventional technology, and details are not described herein) from the upper-layer application (for example, a chat application), a reading or writing procedure adaptation module determines that data that needs to be read by the upper-layer application is data to which the null 10 in the index node 14 of the picture 4 points (certainly, the data may alternatively be data to which the index 143 points).

In this example, the reading or writing procedure adaptation module may detect, based on identification information of an inner-layer index node in the index node 14 or identification information of a deduplicated file, that a file corresponding to the index node 14 is the deduplicated file. In other words, the index node 14 is associated with the inner-layer index node. In this case, S1403 is performed.

In another example, if the reading or writing procedure adaption module detects that the index node 14 does not include the identification information of the inner-layer index node or the identification information of the deduplicated file, the reading or writing procedure adaptation module may determine that a file (namely, the picture 4) corresponding to the index node 14 is not the deduplicated file. In other words, the index node 14 is not associated with any inner-layer index node. In this case, S1402 is performed.

S1402: Read data based on index information.

For example, if the file is not a deduplicated file, a file system may perform processing according to a data reading or writing procedure in a conventional technology, that is, may read content in a corresponding data block based on the index information in an index node, and return the read data to the chat application.

S1403: Detect whether to correspond to an inner-layer index node.

For example, the picture 4 in FIG. 12d is still used as an example. As shown in FIG. 12d, the index node 14 of the picture 4 is associated with the index node 22 (namely, the inner-layer index node), and the index 143 in the index node 14 points to the data block 7. In other words, some indexes (for example, the null 10 and the null 11) in the index node 14 correspond to the inner-layer index node (for example, the index node 22), and some indexes (for example, the index 143) point to data blocks.

In an example, if the reading or writing procedure adaptation module determines, based on an application indication, that data that needs to be read by the chat application is data to which a null index points, namely, data to which an index corresponding to the inner-layer index node (namely, the index node 22) points, S1405 is performed.

In another example, if the reading or writing procedure adaptation module determines, based on an indication from the chat application, that data that the chat application indicates to read is data to which the index 143, namely, the index that directly points to the data block, points, S1404 is performed.

In a possible implementation, the reading or writing procedure adaptation module may alternatively determine, based on an indication from the application, that the index node 14 needs to be read, and the reading or writing procedure adaptation module reads an index in the index node 14 based on a correspondence between the index node 14 and the index node 22 and further based on the indication from the application. If the index is null, an index in the index node 22 corresponding to the null index is determined based on a specific algorithm. If the index is not null, that is, the index node includes a specific storage address (certainly, the index node may alternatively point to another index, and point to specific data through the another index), S1404 is performed.

S1404: Read data based on index information.

For example, FIG. 12d is still used as an example. The index node 143 of the picture 4 points to the data block 7. The reading or writing procedure adaptation module reads data in the corresponding data block 7 based on the index information, namely, the index node 143.

Optionally, as described above, the index node 143 corresponds to a key, namely, the key 14. The reading or writing procedure adaptation module may decrypt the data in the data block 7 based on the key 14, and then transmit the data to the chat application. In this way, a one-file-one-key effect is achieved. In other words, each piece of data corresponds to a key used for encryption or decryption.

S1405: Read data based on index information in the inner-layer index node.

For example, still with reference to FIG. 12d, the reading or writing procedure adaptation module detects that the index node 14 is a node pointing to the inner-layer index node. In an example, if a manner of associating the index node 14 with the inner-layer index node is the method described in the foregoing Manner (1), the reading or writing procedure adaptation module may find, based on the index relationship table, that the index node 14 is associated with the index node 22.

In another example, if a manner of associating the index node 14 with the inner-layer index node is the method described in the foregoing Manner (2), the reading or writing procedure adaptation module may determine, based on identification information of the inner-layer index node, that the index node 14 is associated with the index node 22.

For example, as described above, after the index node 14 is associated with the index node 22, an index that is associated with the index node 22 and that is in the index node 14 is nulled by the deduplication module. Correspondingly, in this step, it is assumed that the reading or writing procedure adaptation module determines, based on an indication from the chat application, that the index that needs to be read by the chat application is the null 10. After the reading or writing procedure adaptation module determines that the index node 14 is associated with the index node 22, the reading or writing procedure adaptation module may obtain, based on a specific algorithm, that an index that corresponds to the null 10 and that is in the index node 22 is the index 221. The reading or writing procedure adaptation module may read a data block to which the index 221 points, namely, the data block 4.

Optionally, the reading or writing procedure adaptation module may decrypt data in the data block 4 based on a key of the index node 22, namely, the key 13, and transmit the decrypted data to the chat application.

Figure 15:
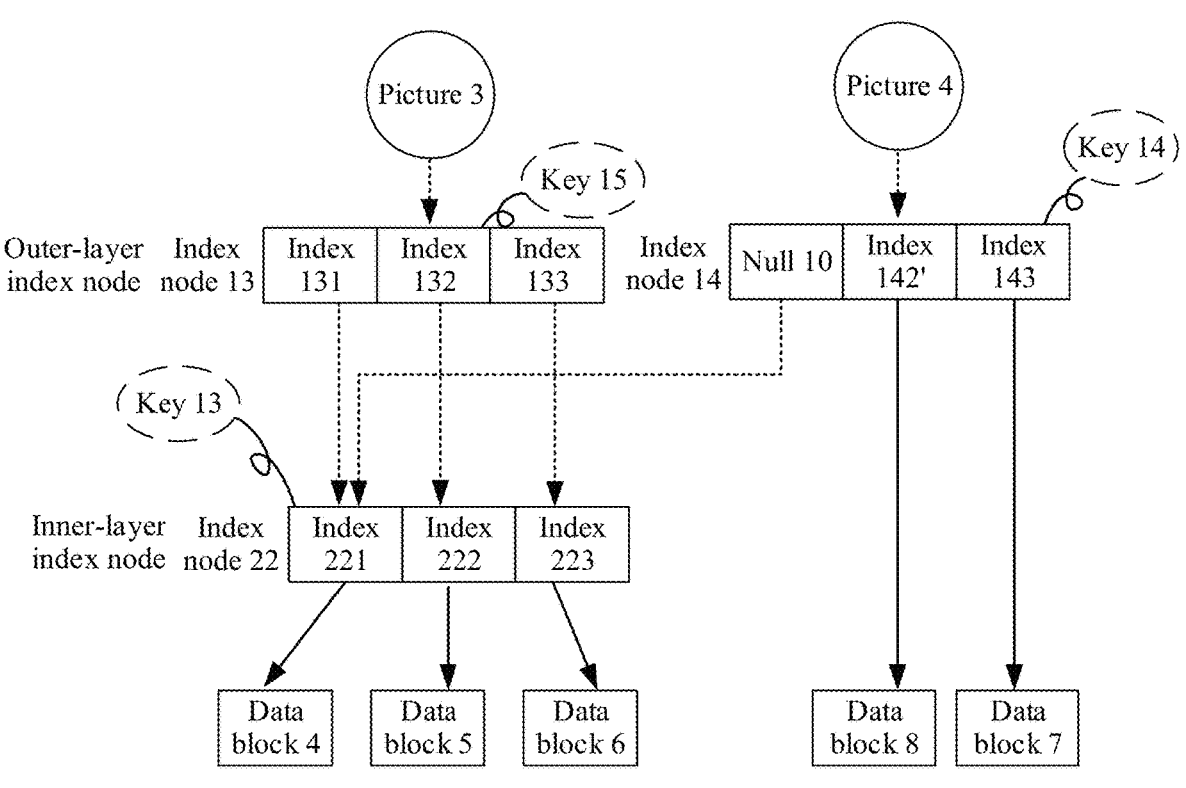
FIG. 15 is a diagram of an example of a data writing procedure.

FIG. 15 is a diagram of an example of a data writing procedure. With reference to FIG. 15, in this example, the picture 4 is still used as an example to describe the data writing procedure. For example, the reading or writing procedure adaptation module may determine, in response to a received indication from the chat application, an index corresponding to data that needs to be written.

In an example, the reading or writing procedure adaptation module determines, in response to the indication from the chat application, that the data needs to be written into a data block to which the null 11 points (refer to FIG. 12d). The reading or writing procedure adaptation module may encrypt data of the chat application based on a key (namely, the key 14) of the index node 14, and write the encrypted data into a data block 8. Correspondingly, the original null 10 in the index node 14 is updated to a location of the data block 8, that is, an index 142' points to the data block 8. Optionally, the location of the data block 8 may be a location that is the same as that of the original data block 4'. Correspondingly, a value of the index 142' is the same as a value of the original index 142. Optionally, the location of the data block 8 may alternatively be a location that is different from that of the original data block 4'. Correspondingly, a value of the index 142' is different from a value of the original index 142. This is not limited in this application.

In another example, the reading or writing procedure adaptation module determines, in response to an indication from the chat application, that the data needs to be written into a data block (namely, the data block 7) to which the index 143 points. For example, the reading or writing procedure adaptation module may overwrite file data in the data block 7. The index 143 still points to the data block 7. For example, new data in the data block 7 is generated through encryption based on the key 14. Optionally, the reading or writing procedure adaptation module may alternatively write new data into another location, and the index 143 points to a new data block. In addition, the reading or writing procedure adaptation module deletes the data block 7.

In still another example, the reading or writing procedure adaptation module determines, in response to an indication from the chat application, that new data needs to be written. The reading or writing procedure adaptation module adds a new index to the index node 14, and configures the new index to point to a new data block. The reading or writing procedure adaptation module may encrypt the new data based on the key 14, and write the encrypted data into space in which the new data block is located. It should be noted that, in an embodiment of this application, data writing and index pointing may be understood as being simultaneous, or may be understood as first configuring an index to point to a corresponding location, and then writing data into the corresponding location.

It should be noted that, for a file that is not a deduplicated file, for a processing manner, refer to the data block 7 or the new data block described above. Details are not described herein again.

Figure 16:
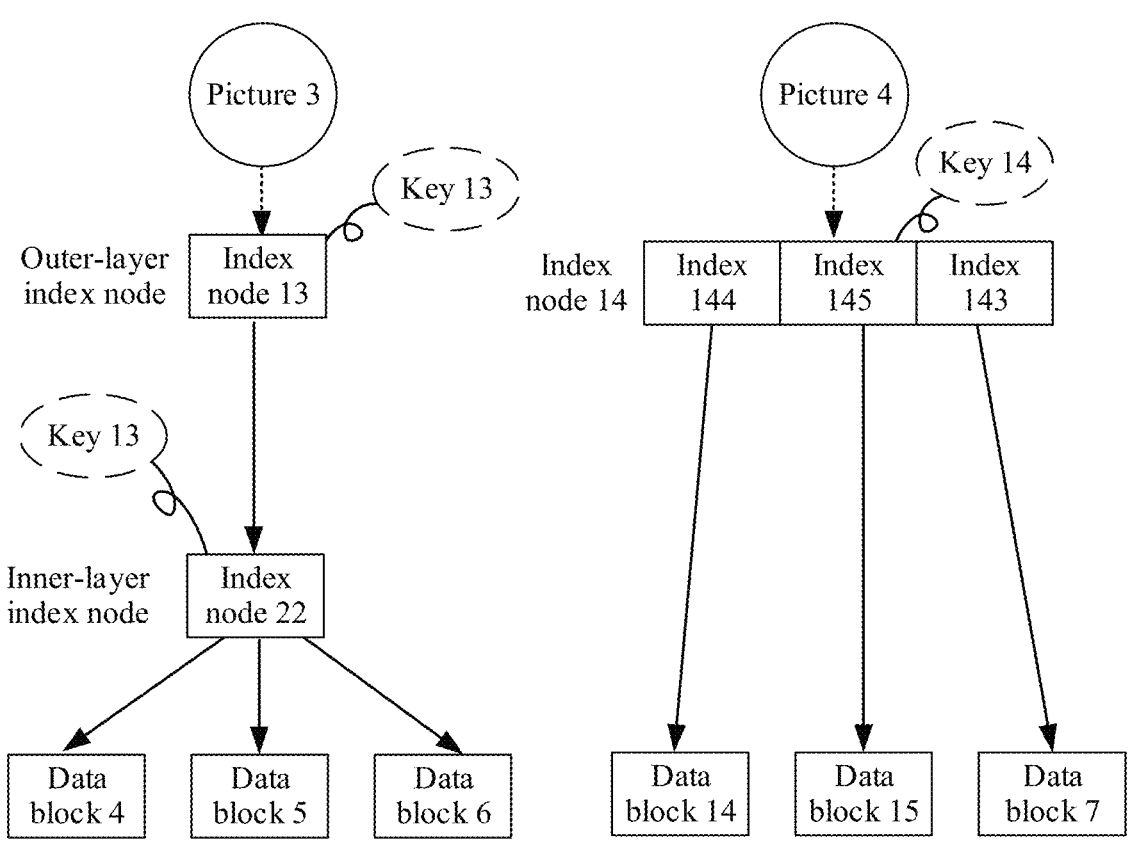
FIG. 16 is a diagram of an example of another data writing procedure.

FIG. 16 is a diagram of an example of another data writing procedure. With reference to FIG. 16, the picture 4 in FIG. 12d is still used as an example. When the reading or writing procedure adaptation module determines, in response to an indication from the chat application, that file data of the picture 4 needs to be modified (including overwriting a data block and writing a new data block), the reading or writing procedure adaptation module may determine (for a specific determining manner, refer to the foregoing descriptions, and details are not described herein again), based on a pointing relationship of the index node 14, that the index node 14 is associated with the index node 12. The reading or writing procedure adaptation module may copy, based on a correspondence between a null index in the index node 14 and an index in the index node 22 (for a specific determining manner, refer to the foregoing descriptions, and details are not described herein again), data to which the index 221 and the index 222 that correspond to the index null 10 and the index null 11 in the index node 14 point, that is, may generate a data block 14 and a data block 15. In addition, an index 144 in the index node 14 points to the data block 14, an index 145 points to the data block 15, and the index node 14 (which is specifically the index 143; refer to FIG. 12d) still points to the data block 7. Data in the data block 14 is the same as data in the data block 4, and data in the data block 15 is the same as data in the data block 5.

For example, the reading or writing procedure adaptation module determines, based on an indication from the chat application, that data needs to be written into the original index null 11, namely, a data block indicated by the current index 145. The reading or writing procedure adaptation module may encrypt the data of the chat application based on the key 14, and write the encrypted data into the data block 15.

For example, if the reading or writing procedure adaptation module determines, based on an indication from the chat application, that a new data block needs to be written, the reading or writing procedure adaptation module adds a new index to the index node 14, encrypts new data, and writes the encrypted data into space to which the new index points.

It may be understood that, in the writing manner shown in FIG. 16, the picture 4 is restored from a deduplicated file including the inner-layer index node to a non-deduplicated file including only a single-layer index node, and then data writing of the picture 4 is performed according to a conventional technical procedure.

Optionally, after writing of the picture 4 is completed, the reading or writing procedure adaptation module may invoke the scanning service to rescan the picture 4, to detect whether an updated picture 4 is still a file that is the same as or similar to the picture 3. If the picture 4 is still a file similar to picture 3, the foregoing deduplication procedure is performed. Certainly, in another embodiment, the reading or writing procedure adaptation module may not invoke the scanning service, and the scanning service may repeat the foregoing procedure for the picture 4 during next scanning.

In a possible implementation, the dual-layer node management module is further used to record a quantity of connections to an inner-layer index node, namely, a quantity of outer-layer index nodes pointing to a same inner-layer index node. For example, the dual-layer node management module may determine, based on an index relationship table or a pointing relationship of an outer-layer index node, an inner-layer index node associated with each index node, and record a quantity of outer-layer nodes corresponding to each inner-layer index node. When the dual-layer node management module detects that the quantity of outer-layer index nodes corresponding to any inner-layer index node is 0, that is, no index node is associated with the inner-layer index node, the dual-layer node management module may delete the inner-layer index node.

Figure 17:
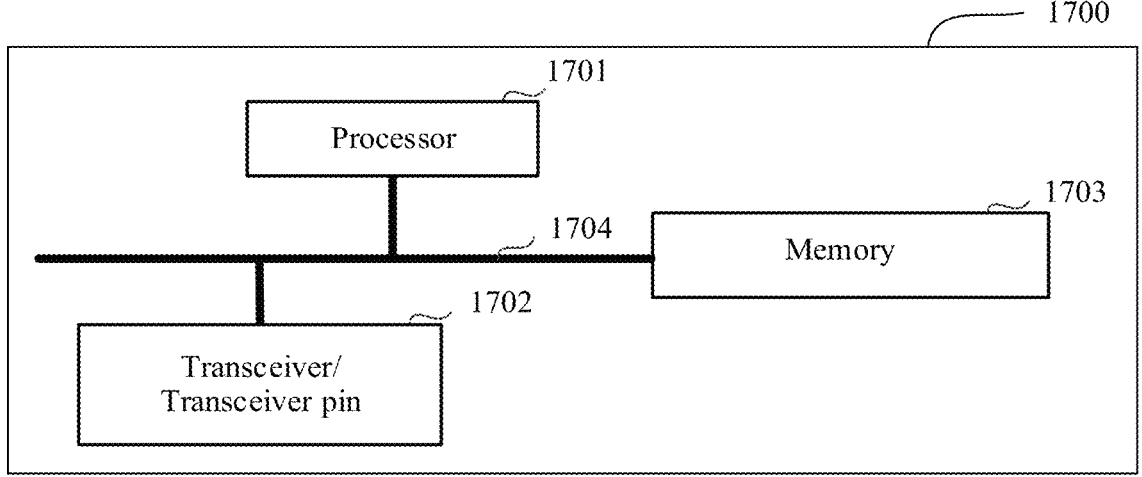
FIG. 17 is a diagram of an example of a structure of an apparatus.

In an example, FIG. 17 is a block diagram of an apparatus 1700 according to an embodiment of this application. The apparatus 1700 may include a processor 1701 and a transceiver/transceiver pin 1702, and optionally, further include a memory 1703.

All components of the apparatus 1700 are coupled together through a bus 1704. In addition to a data bus, the bus 1704 further includes a power bus, a control bus, and a status signal bus. However, for clear description, various buses are referred to as the bus 1704 in the figure.

Optionally, the memory 1703 may be configured to store instructions in the foregoing method embodiments. The processor 1701 may be configured to execute the instructions in the memory 1703, control a receiving pin to receive a signal, and control a sending pin to send a signal.

The apparatus 1700 may be the electronic device or a chip of the electronic device in the foregoing method embodiments.

All related content of the steps in the foregoing method embodiments may be cited in function descriptions of the corresponding functional modules. Details are not described herein again.

An embodiment further provides a computer storage medium. The computer storage medium stores computer instructions. When the computer instructions are run on an electronic device, the electronic device is configured to perform the foregoing related method steps, to implement the method in the foregoing embodiments.

An embodiment further provides a computer program product. When the computer program product runs on a computer, the computer is configured to perform the related steps, to implement the method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the method in the foregoing method embodiments.

The electronic device, the computer storage medium, the computer program product, or the chip provided in this embodiment may be configured to perform the corresponding method provided above. Therefore, for beneficial effects that can be achieved, refer to the beneficial effects of the corresponding method provided above. Details are not described herein again.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that configures a computer program to be transmitted from one place to another. The storage medium may be any available medium accessible by a general-purpose or a dedicated computer.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make modifications without departing from the purposes of this application and the protection scope of the claims, and all the modifications shall fall within the protection of this application.

What is claimed is:

1. A data processing method, comprising:
   detecting, by an electronic device, that a first file and a second file are duplicate files, wherein a first index node of the first file points to file data of the first file, and a second index node of the second file points to file data of the second file;
   generating, by the electronic device, a target index node;
   configuring, by the electronic device, the target index node to point to the file data of the first file;
   associating, by the electronic device, the first index node with the target index node without changing information stored in the first index node;
   associating, by the electronic device, the second index node with the target index node without changing information stored in the second index node; and
   deleting, by the electronic device, the file data of the second file.

2. The method according to claim 1, wherein the step of associating the first index node with the target index node comprises:
   associating identification information of the first index node with identification information of the target index node,
   and wherein the step of associating the second index node with the target index node comprises:
   associating identification information of the second index node with the identification information of the target index node.

3. The method according to claim 2, wherein the identification information of each of the first index node, the second index node, and the target index node comprises identity ID information or address information of said each of the first index node, the second index node, and the target index node.

4. The method according to claim 1, wherein the file data of the first file is partially identical to the file data of the second file, and wherein after the step of associating the second index node with the target index node, the second index node points to a portion of the file data of the second file that is different from the file data of the first file.

5. The method according to claim 1, wherein the first index node comprises a first key, the target index node comprises the first key, the second index node comprises a second key, the file data of the first file is generated through encryption based on the first key, and the file data of the second file is generated based on the second key.

6. The method according to claim 1, further comprising:
in response to first indication information from a target application, determining to read the second file; and
detecting that the second index node is associated with the target index node; and
reading the file data of the first file based on the target index node.

7. The method according to claim 1, further comprising:
in response to second indication information from a target application, writing new data into the file data of the second file, wherein the new data is different from the file data of the first file; and
configuring the second index node to point to the new data, wherein the second index node is still associated with the target index node.

8. The method according to claim 1, wherein before the step of configuring the target index node to point to the file data of the first file, the first index node comprises first index information, the first index information indicates a storage location of the file data of the first file, the second index node comprises second index information, and the second index information indicates a storage location of the file data of the second file.

9. The method according to claim 1, further comprising:
detecting that a third file and the first file are duplicate files;
associating a third index node of the third file with the target index node; and
deleting file data of the third file.

10. A data processing method, comprising:
obtaining, by an electronic device, first indication information from a first application, wherein the first indication information indicates to read data that is pointed to by a second index node of a second file;
in response to the first indication information, detecting, by the electronic device, that the second index node is associated with a target index node without changing information stored in the second index node; and
reading, by the electronic device, first target data that is pointed to by the target index node, wherein the first target data is file data of a first file, the first file and the second file are duplicate files, and a first index node of the first file is associated with the target index node without changing information stored in the first index node.

11. The method according to claim 10, further comprising:
receiving second indication information from a second application, wherein the second indication information indicates to read data that is pointed to by the first index node of the first file;
in response to the second indication information, detecting that the first index node is associated with the target index node; and
reading the first target data that is pointed to by the target index node.

12. The method according to claim 10, wherein the first indication information indicates to read data that is pointed to by the first index information in the second index node of the second file,
and wherein the step of reading the first target data comprises:
detecting, based on the first indication information, that the first index information is null;
obtaining target index information in the target index node that corresponds to the first index information; and
reading the first target data that is pointed to by the target index information.

13. The method according to claim 10, further comprising:
obtaining third indication information from the first application, wherein the third indication information indicates to read data to which second index information in the second index node of the second file points;
in response to the third indication information, detecting that the second index node is associated with the target index node;
detecting whether the second index information is null; and
when the second index information is detected to be not null, reading second target data that is pointed by the second index information, wherein the second target data is file data of the second file, and the second target data is different from the file data of the first file.

14. The method according to claim 13, wherein the first index node comprises a first key, the target index node comprises the first key, the second index node comprises a second key, the file data of the first file is generated through encryption based on the first key, and the file data of the second file is generated based on the second key.

15. The method according to claim 10, further comprising:
receiving fourth indication information from the first application, wherein the fourth indication information indicates to write new data into the second file; and
in response to the fourth indication information, writing the new data into the file data of the second file, wherein the second index node points to the new data and remains being associated with the target index node.

16. The method according to claim 10, wherein before the step of obtaining the first indication information from the first application, the method further comprises:
detecting that the first file and the second file are duplicate files;
generating the target index node, wherein the first index node of the first file points to the file data of the first file, and the second index node of the second file points to the file data of the second file;
configuring the target index node to point to the file data of the first file;
associating the first index node with the target index node;
associating the second index node with the target index node; and
deleting the file data of the second file.

17. An electronic device, comprising:
a memory storing executable instructions; and
one or more processors configured to execute the executable instructions to cause the electronic device to perform operations of:
detecting that a first file and a second file are duplicate files, wherein a first index node of the first file points to file data of the first file, and a second index node of the second file points to file data of the second file;

generating a target index node;

configuring the target index node to point to the file data of the first file;

associating the first index node with the target index node without changing information stored in the first index node;

associating the second index node with the target index node without changing information stored in the second index node; and deleting the file data of the second file.

18. The electronic device according to claim 17, wherein the operation of associating the first index node with the target index node comprises:

associating identification information of the first index node with identification information of the target index node, and wherein the operation of associating the second index node with the target index node comprises:

associating identification information of the second index node with the identification information of the target index node.

* * * * *